(12) United States Patent
Mazed et al.

(10) Patent No.: US 10,009,670 B2
(45) Date of Patent: *Jun. 26, 2018

(54) FAST OPTICAL SWITCH AND ITS APPLICATIONS IN OPTICAL COMMUNICATION

(71) Applicants: Mohammad A. Mazed, Chino Hills, CA (US); Rex Wiig, Chino, CA (US); Angel Martinez, Anaheim, CA (US)

(72) Inventors: Mohammad A. Mazed, Chino Hills, CA (US); Rex Wiig, Chino, CA (US); Angel Martinez, Anaheim, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/731,683

(22) Filed: Jul. 17, 2017

(65) Prior Publication Data

US 2018/0007454 A1 Jan. 4, 2018

Related U.S. Application Data

(63) Continuation-in-part of application No. 14/756,096, filed on Aug. 1, 2015, now Pat. No. 9,746,746.

(60) Provisional application No. 61/999,601, filed on Aug. 1, 2014, provisional application No. 62/498,246, filed on Dec. 20, 2016.

(51) Int. Cl.
*G02F 1/01* (2006.01)
*G02B 6/122* (2006.01)
*H04Q 11/00* (2006.01)

(52) U.S. Cl.
CPC .. *H04Q 11/0005* (2013.01); *H04Q 2011/0011* (2013.01); *H04Q 2011/0016* (2013.01)

(58) Field of Classification Search
None
See application file for complete search history.

(56) References Cited

U.S. PATENT DOCUMENTS

2016/0195676 A1* 7/2016 Yu .................. G02B 6/1226 385/11
2017/0082873 A1* 3/2017 Zia .................. G02F 1/0115

* cited by examiner

Primary Examiner — Eric Wong

(57) ABSTRACT

A fast optical switch can be fabricated/constructed, when a vanadium dioxide ($VO_2$) and a two-dimensional (2-D) material is activated by either an electrical pulse (a voltage pulse or a current pulse) or a light pulse just to induce an insulator-to-metal phase transition (IMT) in vanadium dioxide. The applications of such a fast optical switch for an on-demand optical add-drop subsystem, integrating with or without a wavelength converter are also described.

20 Claims, 23 Drawing Sheets

FAST OPTICAL SWITCH AND ITS APPLICATIONS IN OPTICAL COMMUNICATION

CROSS REFERENCE OF RELATED APPLICATIONS

This application claims the benefit of priority from U.S. Provisional Patent Application No. 62/498,246 ("the '246 provisional patent application") entitled, "FAST OPTICAL SWITCH AND ITS APPLICATIONS IN OPTICAL COMMUNICATION" filed on Dec. 20, 2016.

The present application is a continuation-in-part (CIP) of (a) U.S. Non-Provisional patent application Ser. No. 14/756,096 entitled, "FAST OPTICAL SWITCH AND ITS APPLICATIONS IN OPTICAL COMMUNICATION" filed on Aug. 1, 2015, which (a) claims the benefit of priority from U.S. Provisional Patent Application No. 61/999,601 ("the '601 provisional patent application") entitled, "FAST OPTICAL SWITCH" filed on Aug. 1, 2014.

The entire contents of all Non-Provisional Patent Applications and Provisional Patent Applications as listed in the previous paragraph and the filed Application Data Sheet (ADS) are hereby incorporated by reference.

FIELD OF THE INVENTION

The present invention generally relates to an optical switch and its applications in optical communication. In optical communication, an optical switch enables optical signals to be selectively switched from one optical fiber/optical circuit to another optical fiber/optical circuit. An optical switch can operate by mechanical, electro-optic or magneto-optic effects.

BACKGROUND OF THE INVENTION

The $LiNbO_3$-LN or $(Pb,La)(Zr,Ti)O_3$-PLZT or waveguide-based optical switch is commercially available. The LN/PLZT waveguide-based optical switch is a modified balance bridge type 1×2 switch, which is composed of (a) a Mach-Zehnder (MZ) device integrated with top electrodes and (b) input-output 3-dB couplers.

The switching speed of an LN waveguide-based optical switch is approximately 100 nanoseconds. Furthermore, it suffers from (a) high voltage requirements, (b) polarization dependence problems and (c) DC drift.

The switching speed of a PLZT waveguide-based optical switch is approximately 10 nanoseconds.

The switching speed of a semiconductor optical amplifier (SOA) waveguide-based optical switch is about 1 to 2 nanoseconds. However, the semiconductor optical amplifier waveguide-based optical switch suffers from (a) noise, (b) polarization dependence problems, (c) wavelength dependence problems and (d) high electrical power consumption.

SUMMARY OF THE INVENTION

In view of the foregoing, three objectives of the present invention are:
  to design and fabricate/construct an optical switch with a switching speed of less than 10 nanoseconds;
  to reduce (a) noise, (b) polarization dependence problems, (c) wavelength dependence problems and (d) high electrical power consumption; and
  to create a platform to integrate/co-package other optical components.

Applications for such an optical switch with a switching speed of less than 10 nanoseconds are:
  Optical Communication
  Optical Packet Switches;
  Optical Add-Drop Subsystem For Optical Packets;
  Switched Passive Optical Networks (S-PON);
  Computing
  High Performance Cloud Computers;
  High Performance Data Centers; and
  Optical Interconnects.

DETAILED DESCRIPTION OF THE DRAWINGS

Vanadium dioxide is broadly related to phase transition/change materials. Vanadium dioxide exhibits rapid (less than 10 nanoseconds) insulator-to-metal phase transition upon temperature increase. Vanadium dioxide shows an abrupt decrease of resistance when applied current or voltage exceeds a certain threshold value. This is an electric field-induced rapid phase transition/change.

The rapid (less than 10 nanoseconds) insulator-to-metal phase transition can be utilized in conjunction with a coupled waveguide configuration (e.g., a directional coupler/multi-mode interference (MMI) coupler or Mach-Zehnder (MZ) configuration) to fabricate/construct a fast optical switch.

The operational principle of a directional coupler is evanescent wave coupling in a configuration where two single-mode waveguides come close to each other along a coupling length.

The dimension of the coupling length can depend on other parameters (e.g., overall dimension and switching speed of the optical switch). Furthermore, extinction ratio/power transfer ratio can depend on the index mismatch and the coupling parameters and the state of 120—the vanadium dioxide ultra-thin-film.

Figure 1A:
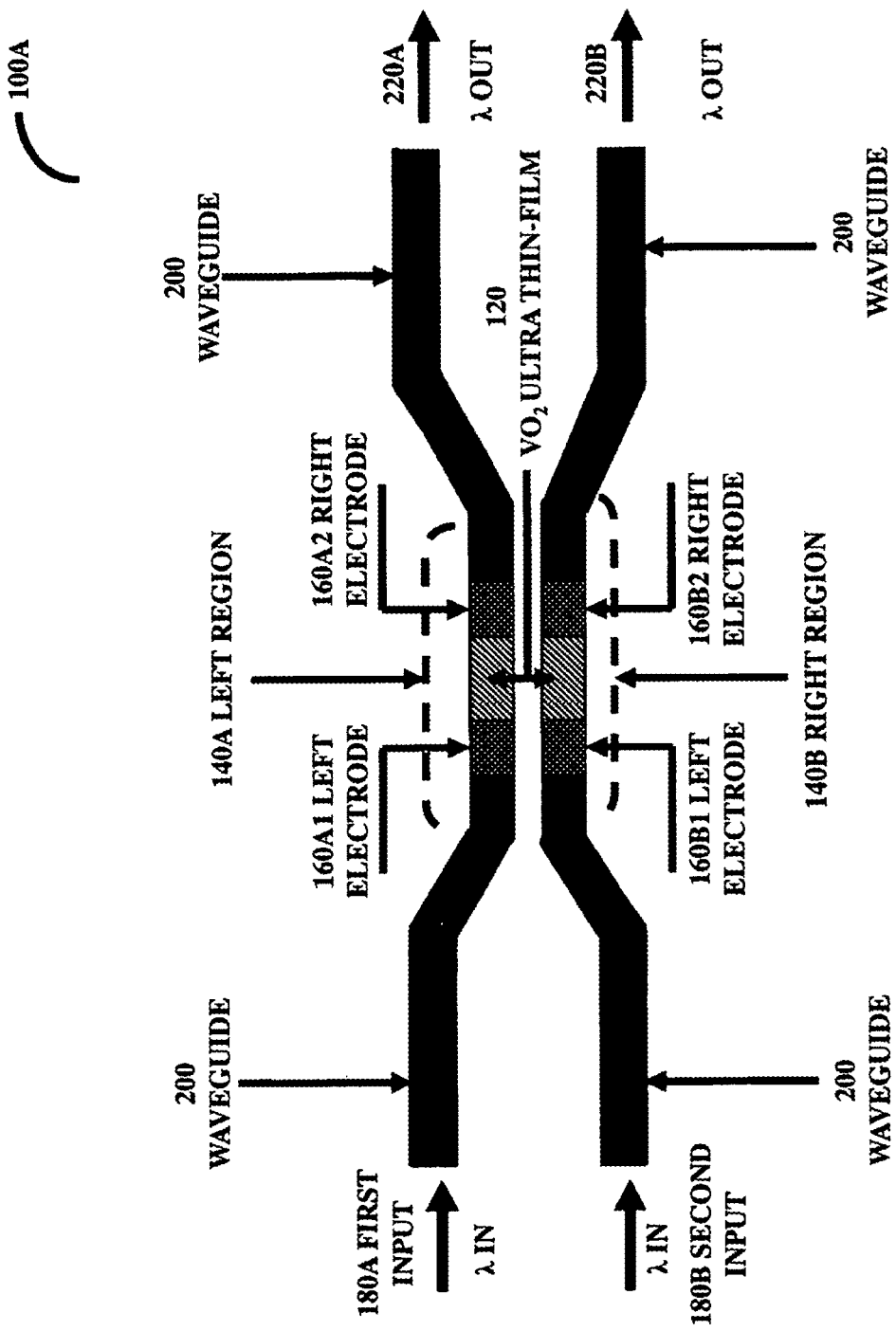
FIG. 1A illustrates an embodiment of a fast optical switch in a directional coupler configuration based on vanadium dioxide ($VO_2$) ultra-thin-film activated by an electrical pulse just to induce an insulator-to-metal phase transition (IMT) in vanadium dioxide ultra-thin-film.

FIG. 1A illustrates an embodiment of 100A—a fast optical switch (in the directional coupler configuration) based on 120—the vanadium dioxide ultra-thin-film activated by an electrical pulse.

100A—the fast optical switch (in the directional coupler configuration) can be fabricated/constructed on a silicon-on-insulator (SOI) substrate.

But, other suitable substrate (e.g., a silicon-on-sapphire (SOS) substrate) can also be utilized.

An electrical pulse can be a current pulse or a voltage pulse. 120—the vanadium dioxide ultra-thin-film is receiving a voltage pulse or a current pulse via two electrodes just to induce an insulator-to-metal phase transition in the vanadium dioxide ultra-thin-film. For example, a square wave-shaped voltage pulse with a rise time of approximately 10 nanoseconds and a fall time of approximately 10 nanoseconds with a pulse duration of 500 nanoseconds can be utilized.

In FIG. 1A, 100A denotes the fast optical switch and 120 denotes vanadium dioxide ultra-thin-film. 140A denotes the left region and 140B denotes the right region. 160A1 denotes the left metal electrode on 120—the vanadium dioxide ultra-thin-film (on 140A—the left region) and 160A2 denotes the right metal electrode on 120—the vanadium dioxide ultra-thin film (on 140A—left legion). 160B1 denotes the left metal electrode on 120—the vanadium dioxide ultra-thin-film (on 140B—the right region) and 160B2 denotes the right metal electrode on 120—the vanadium dioxide ultra-thin-film (on 140B—the right region).

The thickness of 120—the vanadium dioxide ultra-thin-film is less than 0.1 microns.

120—the vanadium dioxide ultra-thin-film is approximately in the range of 0.01 microns$^2$ to 2 microns$^2$ in area on 140A—the left region.

120—the vanadium dioxide ultra-thin-film is approximately in the range of 0.01 microns$^2$ to 2 microns$^2$ in area on 140B—the right region.

It should be noted that by nanoscaling the area of 120—the vanadium dioxide ultra-thin-film in the range of approximately 0.01 microns$^2$, an ultra-fast (approximately 0.1 nanoseconds) optical switch (activated by an electrical pulse) can be realized.

The ridge width and ridge depth of 200—the optical waveguide in 140A—the left region are approximately in the range of 2 microns to 5 microns and 0.1 microns to 1 micron respectively. Furthermore, both ends of 200—the optical waveguide in 140A—the left region can be tapered out gradually for optical mode matching for a higher percentage of single-mode optical fiber coupling.

The ridge width and ridge depth of 200—the optical waveguide in 140B—the right region are approximately in the range of 2 microns to 5 microns and 0.1 microns to 1 micron respectively. Furthermore, both ends of 200—the optical waveguide in 140B—the right region can be tapered out gradually for optical mode matching for a higher percentage of single-mode optical fiber coupling.

The distance between 140A—the left region and 140B—the right region is at or less than 5 microns.

100A—the fast optical switch is a 2×2 fast optical switch with two inputs and two outputs.

The fabrication process of 100A—the fast optical switch (in a directional coupler configuration) is outlined below when 120—the vanadium dioxide is an ultra-thin-film.

Deposition of 120—the vanadium dioxide ultra-thin-film of less than 0.1 microns in thickness by radio frequency (RF) magnetron sputtering from vanadium dioxide target under argon gas flow (approximately 100 sccm) and oxygen gas flow (approximately 10 sccm) at approximately in the range of 300 degrees centigrade to 550 degrees centigrade on a silicon-on-insulator substrate, having a silicon layer thickness of approximately in the range of 0.1 microns to 0.5 microns, having an insulator (silicon dioxide) layer thickness of approximately in the range of 0.25 microns to 3 microns, having a substrate thickness of approximately in the range of 350 microns to 675 microns.

Alternatively, direct current (DC) magnetron sputtering from vanadium target under suitable argon gas flow and oxygen gas flow at approximately in the range of 300 degrees centigrade to 550 degrees centigrade can be utilized to deposit 120—the vanadium dioxide ultra-thin-film.

Alternatively, electron beam evaporation or laser-assisted electron beam evaporation from a high purity form of divanadium tetroxide ($V_2O_4$) powder can be utilized to deposit 120—the vanadium dioxide ultra-thin-film.

Alternatively, a low-temperature atomic layer epitaxial (ALE) process can be utilized to deposit 120—the vanadium dioxide ultra-thin-film.

Alternatively, a low-temperature molecular beam epitaxy (MBE) process can be utilized to deposit 120—the vanadium dioxide ultra-thin-film.

Additionally, a thermal annealing/rapid thermal annealing (RTA) process under suitable argon gas flow and oxygen gas flow can be utilized to enhance grain size and correct any oxygen deficiency of 120—the vanadium dioxide ultra-thin-film.

Additionally, an ultra-thin-film aluminum oxide in the range of 0.010 microns to 0.015 microns in thickness as a buffer layer prior to any deposition of 120—the vanadium dioxide ultra-thin-film can lead to improved crystallinity and textures in 120—the vanadium dioxide ultra-thin-film.

Furthermore, deposition of an ultra-thin-film aluminum oxide in the range of 0.010 microns to 0.015 microns in thickness as a protective layer on 120—the vanadium dioxide ultra-thin-film can be beneficial for future fabrication/processing steps.

Reactive ion or ion etching of 120—the vanadium dioxide ultra-thin-film and the silicon layer (of the silicon-on-insulator substrate) to approximately in the range of 2 microns to 5 microns in width and approximately in the range of 0.1 microns to 1 micron in depth to form 200—an optical waveguide in 140A—the left region and its continued curved structure can be realized. Furthermore, both ends of 200—the optical waveguide can be tapered out gradually for optical mode matching for a higher percentage of single-mode optical fiber coupling.

Similarly, reactive ion or ion etching of 120—the vanadium dioxide ultra-thin-film and the silicon layer (of the silicon-on-insulator substrate) to approximately in the range of 2 microns to 5 microns in width and approximately in the range of 0.1 microns to 1 micron in depth to form 200—an optical waveguide in 140B—the right region and its continued curved structure can be realized. Furthermore, both ends of 200—the optical waveguide can be tapered out gradually for optical mode matching for a higher percentage of single-mode optical fiber coupling.

Electron beam lithography and lift off of:
- a first metal layer of titanium/chromium and a second metal layer of gold for 160A1—the left metal electrode and 160A2—the right metal electrode on 120—the vanadium dioxide ultra-thin-film (on 140A—the left region); and
- the first metal layer of titanium/chromium and the second metal layer of gold for 160B1—the left metal electrode and 160B2—the right metal electrode on 120—the vanadium dioxide ultra-thin-film (on 140B—the right region).

The thickness of the first metal layer of titanium/chromium is approximately in the range of 0.010 microns to 0.02 microns.

The thickness of the second metal layer of gold is approximately in the range of 0.25 microns to 0.35 microns. It should be noted that thickness of the second metal layer of gold can be optimized to reduce stress on 120—the vanadium dioxide ultra-thin-film in mitigating stability/reliability issues with 120—the vanadium dioxide ultra-thin-film.

Furthermore, a high dielectric constant insulator (e.g., hafnium silicate, zirconium silicate, hafnium dioxide and zirconium dioxide) of approximate thickness of 0.005 microns can be fabricated/constructed to electrically insulate two electrodes on 140A—the left region and two electrodes on 140B—the right region from 120—the vanadium dioxide ultra-thin-film.

Alternatively, a parallel plate capacitor with an air gap can be utilized instead of the high dielectric constant insulator. When a voltage pulse is applied across electrodes on a parallel plate capacitor, an electric field due to the voltage pulse is established across the air gap and a smaller electric field due to the voltage pulse is then coupled with 120—the vanadium dioxide ultra-thin-film.

It should be noted that the above fabrication steps can be modified in a number of ways (e.g., self alignment and/or planarization) for not heating adjacent silicon, as heating adjacent silicon can undesirably slow the switching speed of 100A—the optical switch.

Dicing, testing and single-mode optical fiber pigtailing of 100A—the fast optical switch chips can be realized.

Connecting the tested/pigtailed good 100A—the fast optical switch chips onto a printed electronics circuit board can be realized.

In FIG. 1A, 180A denotes a first input port of an input wavelength and 180B denotes a second input port of an input wavelength. 200 denotes the optical waveguide. The input wavelength at 180A—the first input port can exit via 220A—an output exit when 140A—the left region comprising 120—the vanadium dioxide ultra-thin-film is not electrically activated by an electrical pulse on both 160A1—the left metal electrode and 160A2—the right metal electrode on 120—the vanadium dioxide ultra-thin-film (on 140A—the left region).

However, the input wavelength at 180A—the first input port can exit via 220B—an output exit, when 140A—the left region comprising 120—the vanadium dioxide ultra-thin-film is electrically activated by an electrical pulse on both 160A1—the left metal electrode and 160A2—the right metal electrode on 120—the vanadium dioxide ultra-thin-film (on 140A—the left region) just to induce an insulator-to-metal phase transition in 120—the vanadium dioxide ultra-thin-film.

Similarly, the input wavelength at 180B—the second input port can exit via 200A—an output exit when 140B— the right region comprising the 120—the vanadium dioxide ultra-thin-film is electrically activated by an electrical pulse on both 160B1—the left metal electrode and 160B2—the right metal electrode on 120—the vanadium dioxide ultra-thin-film (on 140B—the right region) just to induce an insulator-to-metal phase transition in 120—the vanadium dioxide ultra-thin-film.

120—the vanadium dioxide ultra-thin-film is receiving an electrical pulse just to induce an insulator-to-metal phase transition in 120—the vanadium dioxide ultra-thin-film.

Other coupler configurations (e.g., multimode interference configuration) can be realized by using an electrical pulse for inducing an insulator-to-metal phase transition in 120—the vanadium dioxide ultra-thin-film.

It should be noted that a cluster of vanadium dioxide particles (less than 0.5 microns in diameter) embedded in an ultra-thin-film of a polymeric material or in a mesh of metal nanowires can be utilized instead of 120—the vanadium dioxide ultra-thin-film in fabricating/constructing 100A—the fast optical switch activated by an electrical pulse. The polymeric material can be either conducting, semiconducting or non-conducting. Thus, vanadium dioxide particles (less than 0.5 microns in diameter) embedded in an ultra-thin-film of a polymeric material or in a mesh of metal nanowires can receive an electrical pulse just to induce an insulator-to-metal phase transition in the cluster of vanadium dioxide particles (less than 0.5 microns in diameter).

Furthermore, 120—the vanadium dioxide ultra-thin-film can be replaced by a monolayer(s) of a two-dimensional (2-D) material (e.g., germanene, graphene, phosphorene, silicene and stanene) first, then followed by the vanadium dioxide ultra-thin-film last (option 1) or the vanadium dioxide ultra-thin-film first, then followed by a monolayer(s) of a two-dimensional material last (option 2) or a monolayer(s) of a two-dimensional material first then followed by the vanadium dioxide ultra-thin-film in the middle, then followed by a monolayer(s) of a two-dimensional material last (option 3). Integration of a monolayer(s) of a two-dimensional material can enable faster heat dissipation and/or electronic properties of the entire stacked materials for faster off switching time. The total thickness of the vanadium dioxide ultra-thin-film and a monolayer(s) of a two-dimensional (2-D) material is less than 0.15 microns. It should be noted that the two-dimensional material and/or vanadium dioxide can be in the form a quantum dot(s). It should be noted that vanadium dioxide can also be doped.

Figure 1B:
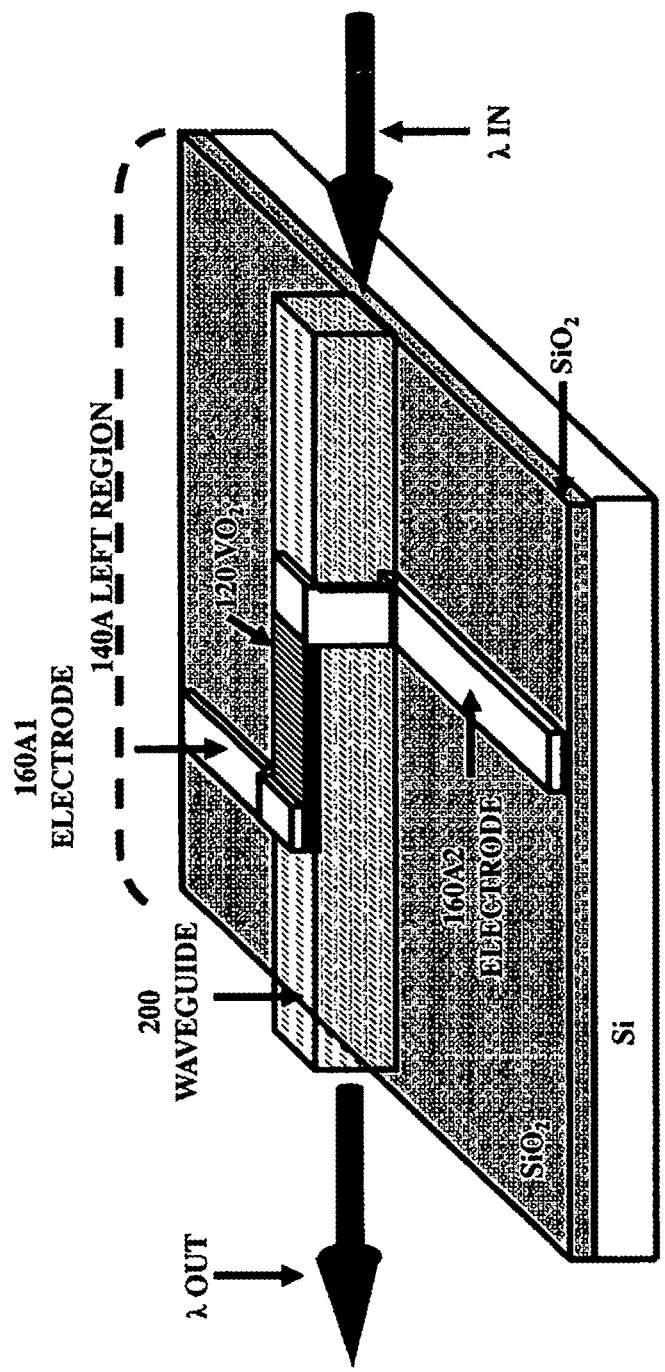
FIG. 1B illustrates a cross-sectional view of two metal electrodes on vanadium dioxide ultra-thin-film on the left region of the fast optical switch in the directional coupler configuration.

FIG. 1B illustrates a cross-sectional view of 160A1—the left metal electrode and 160A2—the right metal electrode on 120—the vanadium dioxide ultra-thin-film (on 140A—the left region), wherein 120—the vanadium dioxide ultra-thin-film is on the silicon layer of the silicon-on-insulator substrate. 200 denotes the optical waveguide.

Figure 1C:
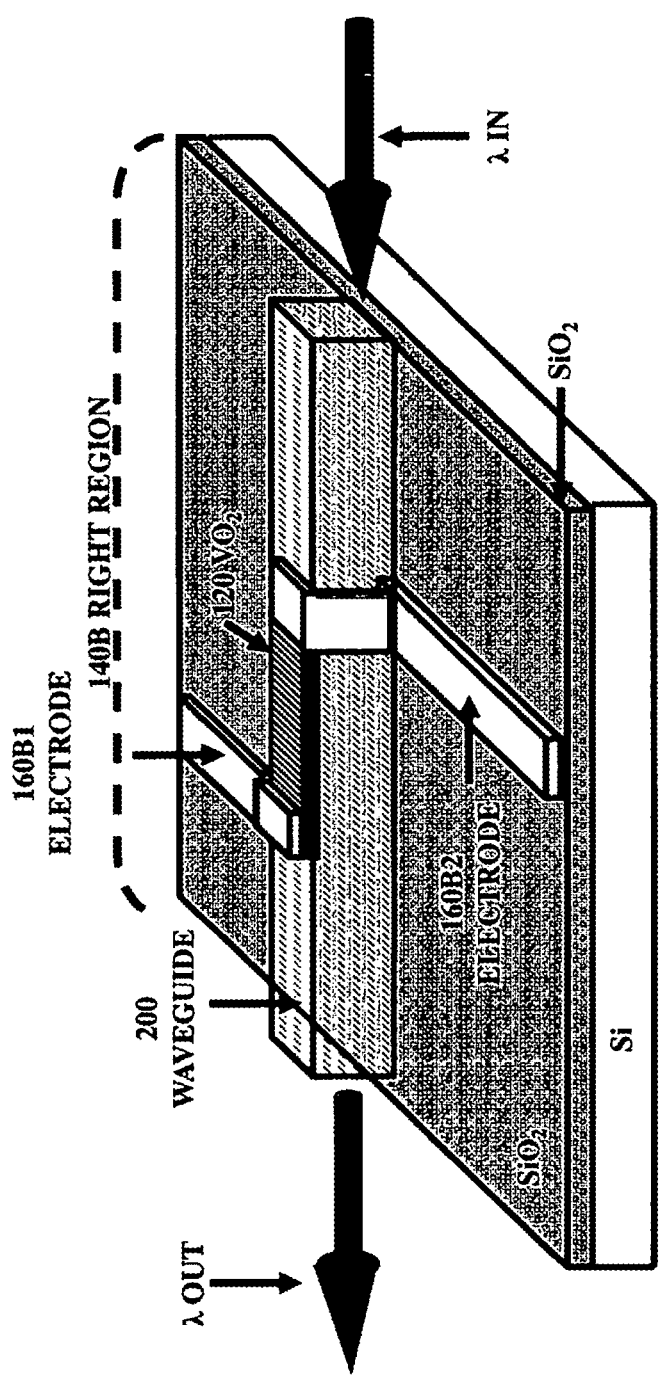
FIG. 1C illustrates a cross-sectional view of two metal electrodes on vanadium dioxide ultra-thin-film on the right region of the fast optical switch in the directional coupler configuration.

FIG. 1C illustrates a cross-sectional view of 160B1—the left metal electrode and 160B2—the right metal electrode on 120—the vanadium dioxide ultra-thin-film (140B—the right region), wherein 120—the vanadium dioxide ultra-thin-film is on the silicon layer of the silicon-on-insulator substrate. 200 denotes the optical waveguide.

Furthermore, the silicon layer of the silicon-on-insulator substrate can be reactive ion or ion etched up to the silica layer of the silicon-on-insulator substrate.

Figure 2:
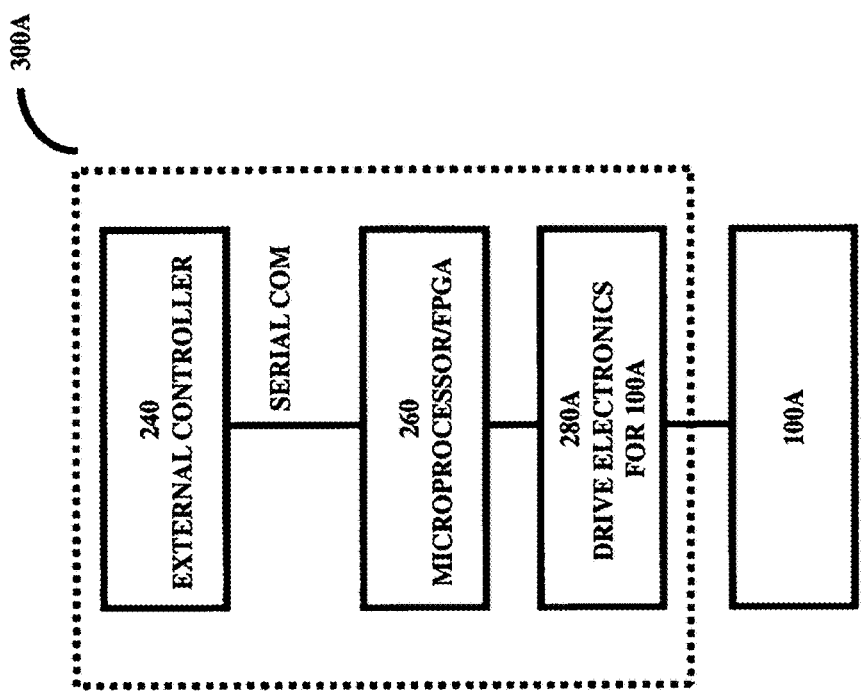
FIG. 2 illustrates an embodiment of an electronic subsystem to drive the fast optical switch based on vanadium dioxide ultra-thin-film activated by an electrical pulse.

FIG. 2 illustrates an embodiment of 300A—an electronic subsystem to drive 100A—the fast optical switch (based on 120—the vanadium dioxide ultra-thin-film activated by an electrical pulse).

In FIG. 2, 240 denotes an external controller, 260 denotes a microprocessor/field programmable gate array (FPGA) and 280A denotes a drive electronics unit/module for 100A—the fast optical switch.

300A—the electronic subsystem integrates 240, 260 and 280A. 300A—the electronic subsystem is to drive 100A—the fast optical switch.

240—the external controller can communicate serially with 260—the microprocessor/field programmable gate array.

Figure 3:
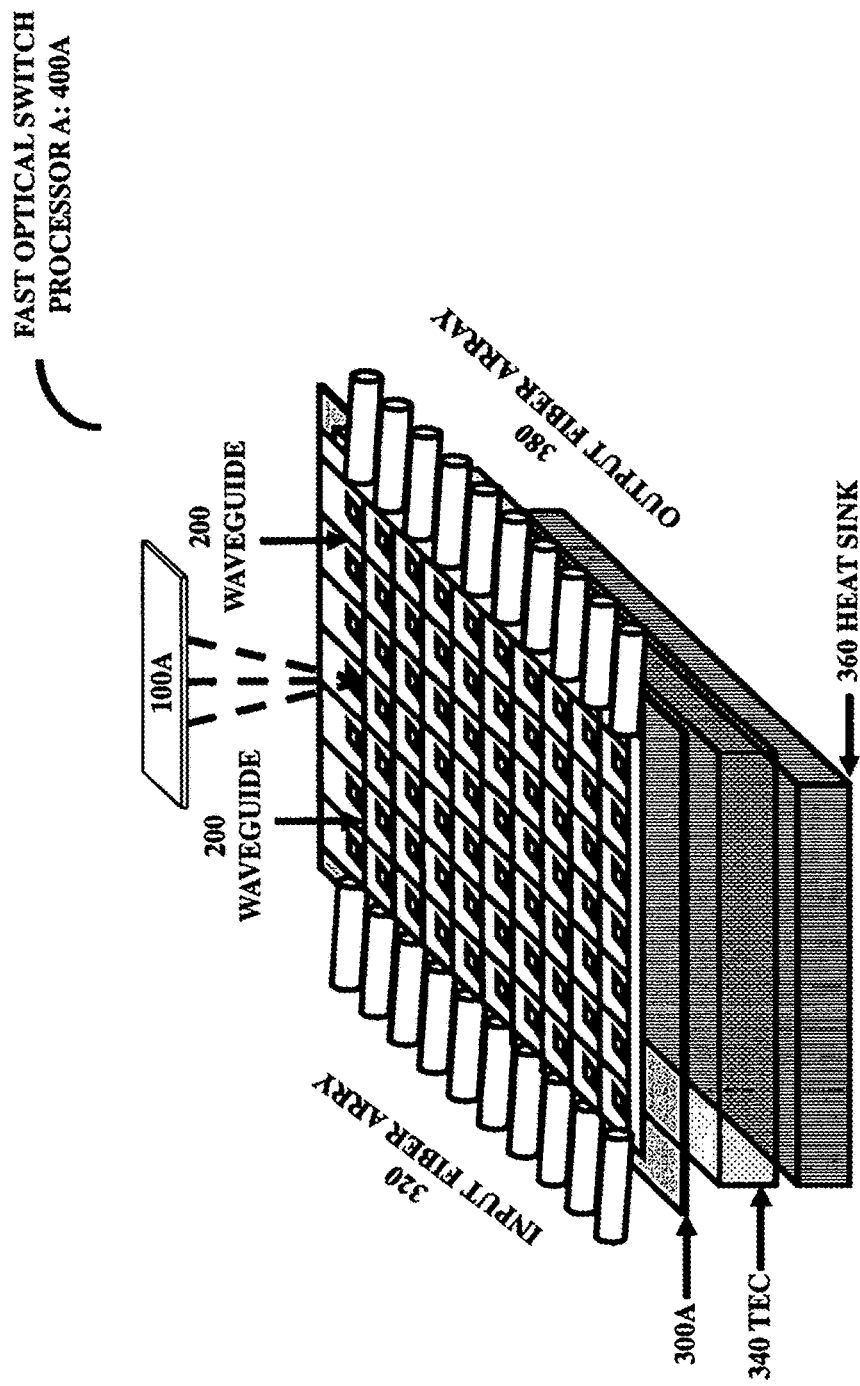
FIG. 3 illustrates an embodiment of a fast optical switch processor A comprising the fast optical switch (based on vanadium dioxide ultra-thin-film activated by an electrical pulse) in a matrix configuration.

FIG. 3 illustrates an embodiment of 400A—a fast optical switch processor A, comprising 100A—the fast optical switch in a matrix configuration (wherein 100A—the fast optical switch is based on 120—the vanadium dioxide ultra-thin-film activated by an electrical pulse just to induce an insulator-to-metal phase transition in 120—the vanadium dioxide ultra-thin-film).

In FIG. 3, 400A denotes a fast optical switch processor A; 200 denotes the optical waveguide; 320 denotes an input single-mode optical fiber array; 300A denotes the electronic subsystem to drive 100A—the fast optical switch (based on 120—the vanadium dioxide ultra-thin film activated by an electrical pulse); 340 denotes a thermoelectric cooler (TEC) to maintain 400A—the fast optical switch processor A at a specified temperature; 360 denotes a heat sink and 380 denotes an output single-mode optical fiber array.

Thus, 400A—the fast optical switch processor A can switch a wavelength from any input fiber to any output fiber in less than 10 nanoseconds.

Figure 4:
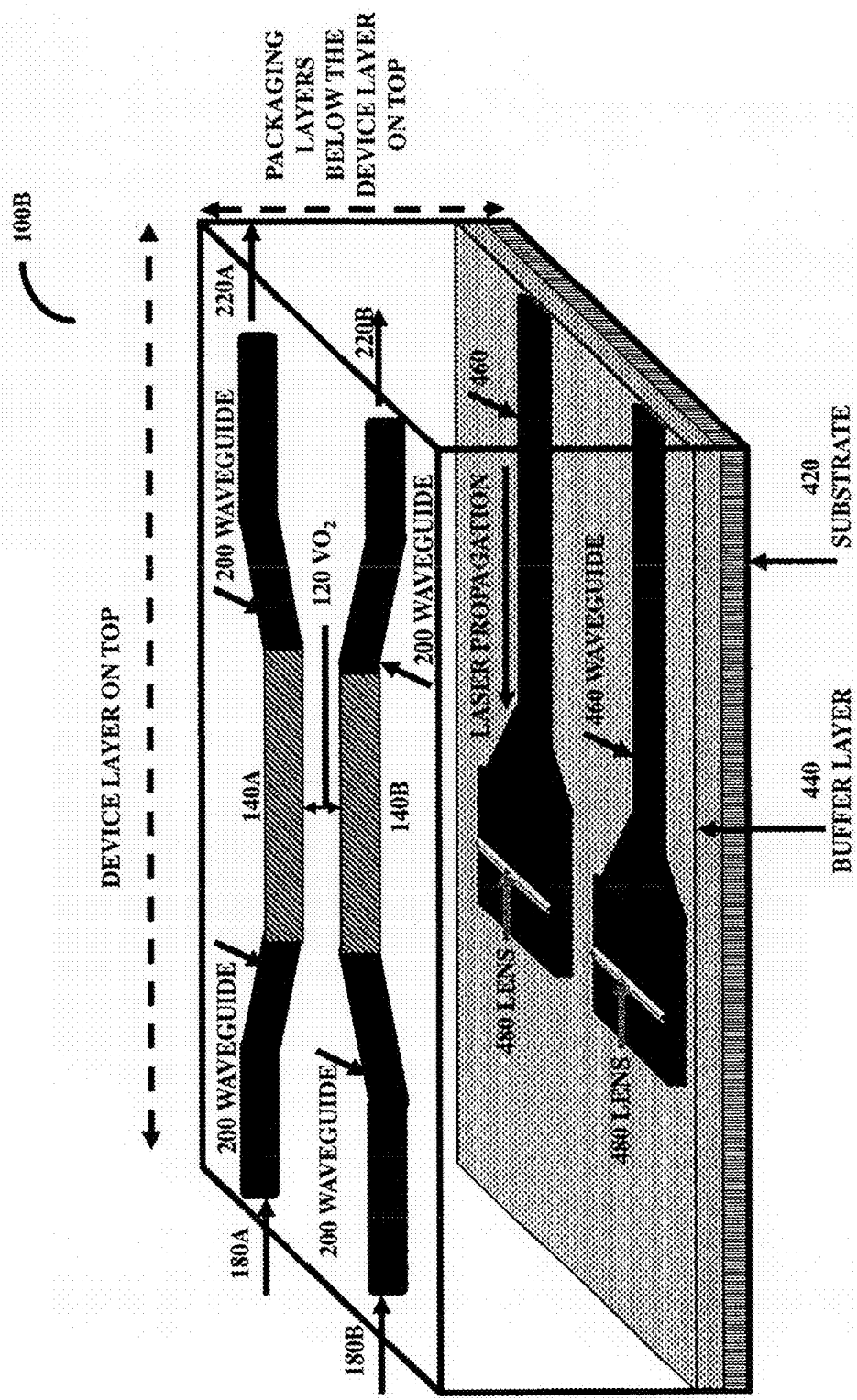
FIG. 4 illustrates an embodiment of the fast optical switch based on vanadium dioxide ultra-thin-film activated by a light pulse just to induce an insulator-to-metal phase transition in vanadium dioxide ultra-thin-film.

FIG. 4 illustrates an embodiment of 100B—a fast optical switch (in the directional coupler configuration) based on the 120—the vanadium dioxide ultra-thin-film, activated by a light pulse, on a silicon-on-insulator substrate.

In FIG. 4, 100B denotes a fast optical switch, 120 denotes vanadium dioxide ultra-thin-film. 140A denotes the left region and 140B denotes the right region.

The thickness of 120—the vanadium dioxide ultra-thin-film is less than 0.1 microns.

120—the vanadium dioxide ultra-thin-film is approximately in the range of 0.01 microns$^2$ to 2 microns$^2$ in area on 140A—the left region.

120—the vanadium dioxide ultra-thin-film is approximately in the range of 0.01 microns$^2$ to 2 microns$^2$ in area on 140B—the right region.

It should be noted that by nanoscaling the area of 120—the vanadium dioxide ultra-thin-film in the range of approximately 0.01 microns$^2$, an ultrafast (approximately 0.1 nanoseconds) optical switch (activated by a light pulse) can be realized.

The ridge width and ridge depth of 200—the optical waveguide in 140A—the left region are approximately in the range of 2 microns to 5 microns and 0.1 microns to 1 micron respectively. Furthermore, both ends of 200—the optical waveguide in 140A—the left region can be tapered out gradually for optical mode matching for a higher percentage of single-mode optical fiber coupling.

The ridge width and ridge depth of 200—the optical waveguide in 140B—the right region are approximately in the range of 2 microns to 5 microns and 0.1 microns to 1 micron respectively. Furthermore, both ends of 200—the optical waveguide in 140B—the right region can be tapered out gradually for optical mode matching for a higher percentage of single-mode optical fiber coupling.

The distance between 140A—the left region and 140B—the right region is at or less than 5 microns.

100B—the fast optical switch is a 2×2 fast optical switch with two inputs and two outputs.

In FIG. 4, 180A denotes the first input port of the input wavelength. The input wavelength at 180A—the first input port can exit via 220A—the output exit when 140A—the left legion comprising 120—the vanadium dioxide ultra-thin-film is not optically activated by a light pulse on 120—the vanadium dioxide ultra-thin-film on 140A—the left region.

However, the input wavelength at 180A—the first input port can exit via 220B—the output exit when 140A—the left region comprising 120—the vanadium dioxide ultra-thin-film is optically activated by a light pulse (e.g., a light pulse from a mode locked semiconductor laser) on 120—the vanadium dioxide ultra-thin-film on 140A—the left region just to induce an insulator-to-metal phase transition on 120—the vanadium dioxide ultra-thin-film.

Similarly, the input wavelength at 180B—the second input port can exit via 200A—the output exit when 140B—the right region comprising 120—the vanadium dioxide ultra-thin-film is optically activated by a light pulse (e.g., a light pulse from a mode locked semiconductor laser) on 120—the vanadium dioxide ultra-thin-film on 140B—the right region just to induce an insulator-to-metal phase transition on 120—the vanadium dioxide ultra-thin-film.

The intensity (optical power per unit area) of the light pulse is approximately in the range of 0.1 $mJ/cm^2$ to 50 $mJ/cm^2$. The pulse width of the light pulse is approximately in the range of 0.001 nanoseconds to 0.1 nanoseconds.

The 120—the vanadium dioxide ultra-thin-film is receiving a light pulse just to induce an insulator-to-metal phase transition in 120—the vanadium dioxide ultra-thin-film.

The light pulse can propagate through 460—a waveguide and be focused by 480—a lens onto 120—the vanadium dioxide ultra-thin-film.

However, either a focusing up configuration or a focusing down configuration is possible

460—the waveguide is fabricated/constructed on 440—a buffer layer, wherein 440—the buffer layer is fabricated/constructed on 420—a suitable substrate (e.g., a silicon-on-insulator substrate).

One pulsed light source is required for 140A—the left region comprising 120—the vanadium dioxide ultra-thin-film and another pulsed light source is required for 140B—the right region; comprising 120—the vanadium dioxide ultra-thin-film.

Furthermore, 480—a metamaterial-based lens can be utilized for focusing of the light pulse below the diffraction limit.

Other coupler configurations (e.g., multimode interference configuration) can be realized by a light pulse for just inducing an insulator-to-metal phase transition in 120—the vanadium dioxide ultra-thin-film.

It should be noted that a cluster of vanadium dioxide particles (less than 0.5 microns in diameter) embedded in an ultra-thin-film of polymeric material or in a mesh of metal nanowires can be utilized, instead of 120—the vanadium dioxide ultra-thin-film in fabricating/constructing 100A—the fast optical switch; activated by a light pulse. The polymeric material can be either conducting, semiconducting or non-conducting. Thus, vanadium dioxide particles (less than 0.5 microns in diameter) embedded in an ultra-thin-film of polymeric material or in a mesh of metal nanowires can receive a light pulse just to induce an insulator-to-metal phase transition in the cluster of vanadium dioxide particles (less than 0.5 microns in diameter).

Furthermore, 120—the vanadium dioxide ultra-thin-film can be replaced by a monolayer(s) of a two-dimensional (2-D) material (e.g., germanene, graphene, phosphorene, silicene and stanene) first, followed by the vanadium dioxide ultra-thin-film last (option 1) or the vanadium dioxide ultra-thin-film first, followed by a monolayer(s) of a two-dimensional material last (option 2) or a monolayer(s) of a two-dimensional material first, followed by the vanadium dioxide ultra-thin-film in the middle, followed by a monolayer(s) of a two-dimensional material last (option 3). Integration of a monolayer(s) of a two-dimensional material can enable faster heat dissipation and/or electronic properties of the entire stacked materials for faster off switching time. The total thickness of the vanadium dioxide ultra-thin-film and a monolayer(s) of a two-dimensional (2-D) material is less than 0.15 microns.

Figure 5:
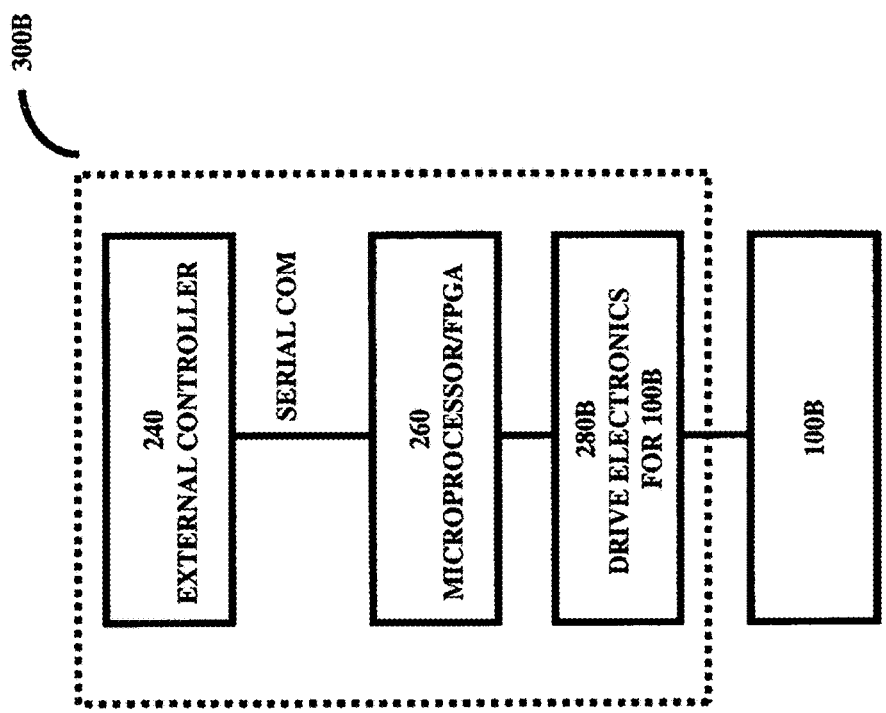
FIG. 5 illustrates an embodiment of an electronic subsystem to drive the fast optical switch based on vanadium dioxide ultra-thin-film activated by a light pulse.

FIG. 5 illustrates an embodiment of 300B—an electronic subsystem to drive 100B—the fast optical switch (based on 120—the vanadium dioxide ultra-thin-film activated by a light pulse).

In FIG. 5, 240 denotes the external controller, 260 denotes the microprocessor/field programmable gate array, and 280B denotes a drive electronics unit/module for 100B—the fast optical switch (based on 120—the vanadium dioxide, ultra-thin-film activated by a light pulse).

300B—the electronic subsystem integrates 240, 260 and 280B. 300B—the electronic subsystem to drive 100B—the fast optical switch (based on 120—the vanadium dioxide ultra-thin-film activated by a light pulse).

240—the external controller can communicate serially with 260—the microprocessor/field programmable gate array.

Figure 6:
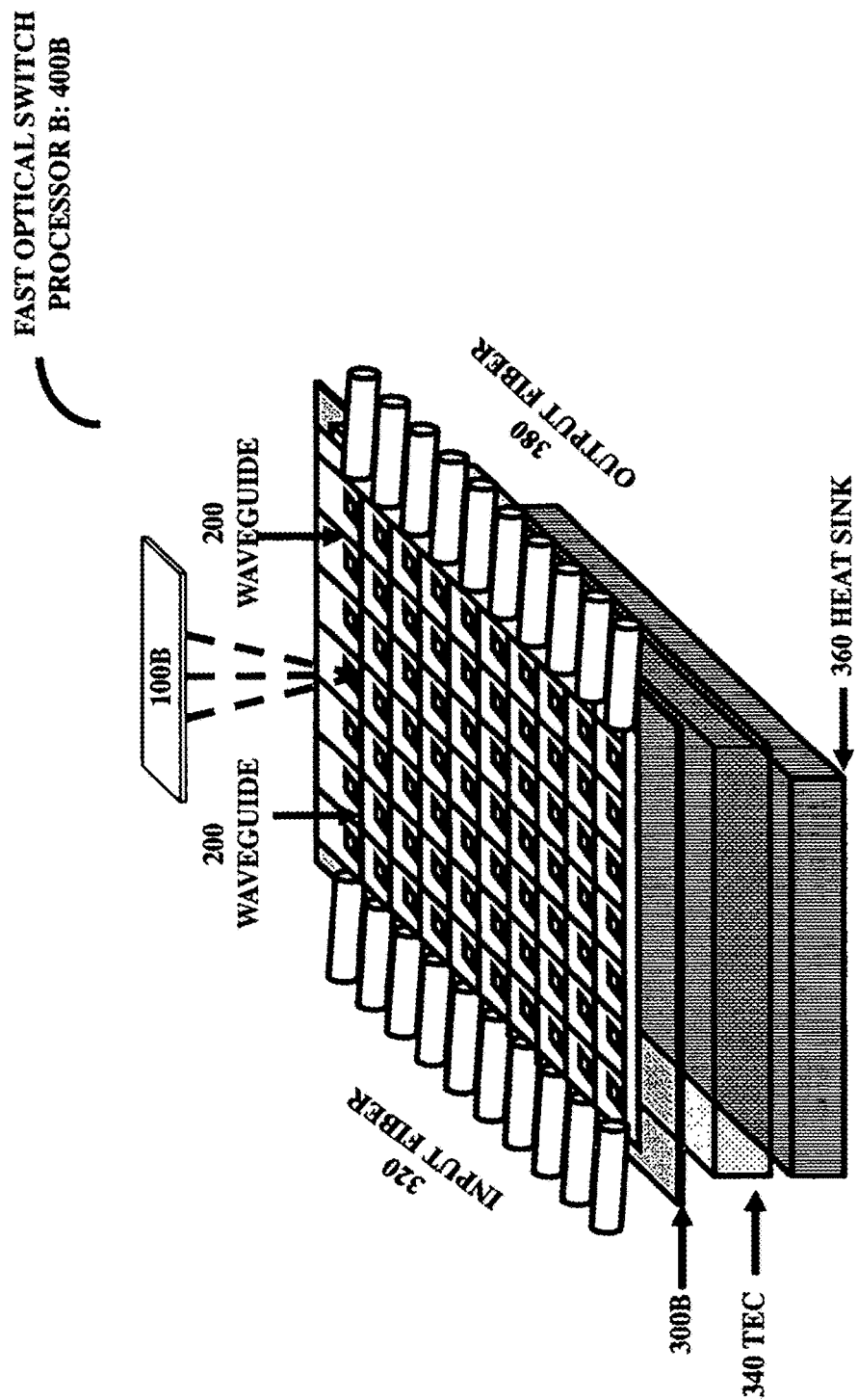
FIG. 6 illustrates an embodiment of a fast optical switch processor B comprising the fast optical switch (based on vanadium dioxide ultra-thin-film activated by a light pulse) in a matrix configuration.

FIG. 6 illustrates an embodiment of 400B—a fast optical switch processor B, comprising 100B—the fast optical switch in a matrix configuration (wherein 100B—the fast optical switch is based on 120 the vanadium dioxide ultra-thin-film activated by a light pulse just to induce an insulator-to-metal phase transition in vanadium dioxide ultra-thin-film).

In FIG. 6, 400B denotes a fast optical switch processor B; 200 denotes the optical waveguide; 320 denotes the input single-mode optical fiber array; 300B denotes the electronic subsystem to drive 100B—the fast optical switch (based on 120—the vanadium dioxide ultra-thin-film activated by a light pulse); 340 denotes the thermoelectric cooler to maintain 400B—the optical switch processor B at a specified temperature; 360 denotes the heat sink, and 380 denotes the output single-mode optical fiber array.

Thus, 400B—the fast optical switch processor B can switch a wavelength from any input fiber to any output fiber in less than 10 nanoseconds.

Figure 7:
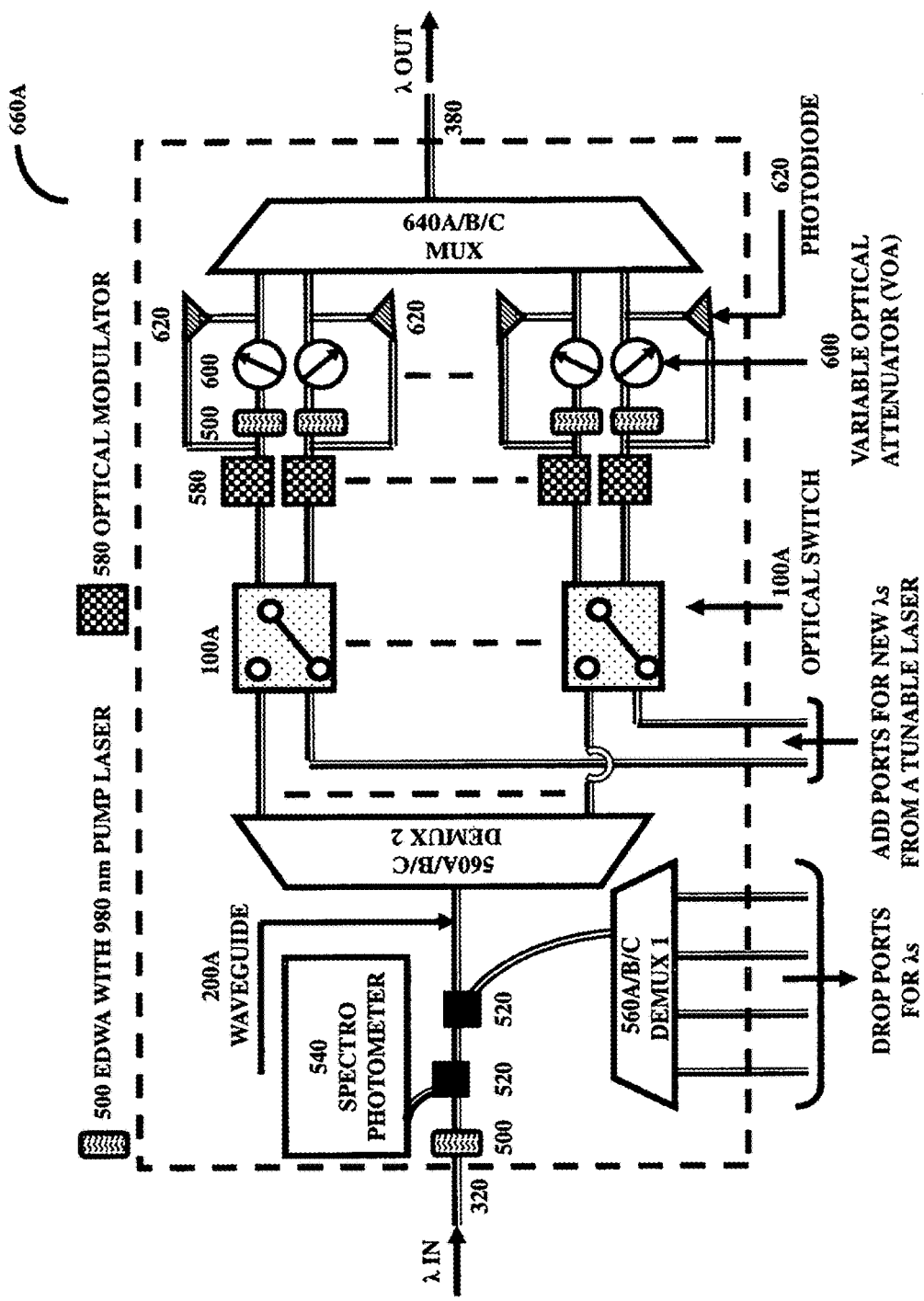
FIG. 7 illustrates an on-demand optical add-drop subsystem (OADS) integrated with the fast optical switch (wherein the fast optical switch is based on vanadium dioxide ultra-thin-film activated by an electrical pulse).

FIG. 7 illustrates 660A—an on-demand optical add-drop subsystem integrated with 100A—the fast optical switch (wherein 100A—the fast optical switch is based on 120—the vanadium dioxide ultra-thin-film activated by an electrical pulse).

In FIG. 7, all input wavelengths from 320—an input optical fiber can be transmitted via 200A—an optical waveguide and amplified by 500—an erbium doped waveguide amplifier (EDWA) integrated with a 980-nm pump laser, tapped by 520—a tap coupler to measure wavelengths by 540—a spectrophotometer. A few wavelengths can proceed to 560A/560B/560C—a first wavelength demultiplexer 1 and then exit to the drop ports. Other express wavelengths can proceed to 560A/560B/560C—a second wavelength demultiplexer 2 for demultiplexing then as selective inputs to 100A—the fast optical switch.

It should be noted that a semiconductor optical amplifier can be utilized instead of 500—the erbium doped waveguide amplifier integrated with a 980-nm pump laser 500.

It should be noted that arrayed waveguide gratings (AWG) based wavelength multiplexers/demultiplexers can also be utilized.

560A denotes a fixed (wavelength) demultiplexer, 560B denotes a (wavelength) tunable demultiplexer and 560C denotes a (wavelength) tunable one-dimensional (1-D) photonic crystal based demultiplexer.

An array of rapidly wavelength tunable lasers can provide a set of new wavelengths to add ports. The output (wavelengths) of 560A/560B/560C—the second wavelength demultiplexer 2 and these newly added wavelengths can be switched by an array of 100As—the fast optical switches.

Switched wavelengths from 100As—the fast optical switches can be modulated by 580s-optical modulators (e.g., silicon traveling-waveguide/graphene-on-silicon optical modulators).

The optical power output of 580—the optical modulator can be controlled by 500—the erbium doped waveguide amplifier integrated with a 980-nm pump laser, 600—a variable optical attenuator (VOA) (e.g., a PLZT-based variable optical attenuator) and 620—a photodiode.

The modulated wavelengths (or modulated optical signals) can be independently controlled at a specified optical power and then multiplexed by 640A/640B/640C—a multiplexer. Thus, independent control of each wavelength can enable an approximately flat optical power curve for all output wavelengths at 380—an output optical fiber.

640A denotes a fixed (wavelength) multiplexer, 640B denotes a (wavelength) tunable multiplexer and 640C denotes a (wavelength) tunable one-dimensional photonic crystal-based multiplexer.

A wavelength tunable multiplexer/demultiplexer includes a control circuit and one or more controls such as heaters thermally coupled and/or refractive index changing electrical paths electrically coupled to waveguides of the multiplexer/demultiplexer.

The control circuit is in signal communication with one or more controls and also includes a microprocessor/field programmable gate array coupled with an electronic memory component. The control circuit receives an identification signal and adjusts the control in response to the identification signal and based on parameter values stored in the electronic memory component.

Alternatively, a voltage tunable multiplexer/demultiplexer can be realized when the material composition of the multiplexer/demultiplexer is a crystalline semiconductor (e.g., indium phosphide) rather than silica. Furthermore, the transmission characteristics of the tunable multiplexer/demultiplexer can be varied depending on external control input(s).

Figure 8:
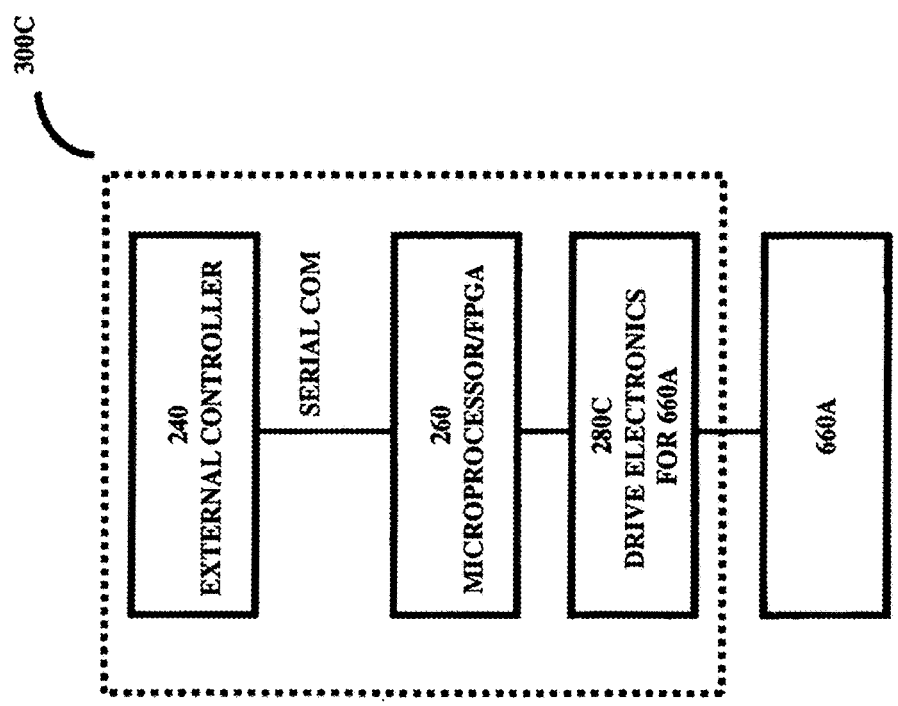
FIG. 8 illustrates an embodiment of an electronic subsystem to drive the on-demand optical add-drop subsystem integrated with the fast optical switch (wherein the fast optical switch is based on vanadium dioxide ultra-thin-film activated by an electrical pulse).

FIG. 8 illustrates an embodiment of 300C—an electronic subsystem to drive 660A—the on-demand optical add-drop subsystem, integrated with 100A—the fast optical switch (wherein 100A—the fast optical switch is based on 120—the vanadium dioxide ultra-thin-film activated by an electrical pulse).

In FIG. 8, 240 denotes the external controller, 260 denotes the microprocessor/field programmable gate array and 280C denotes a drive electronics unit/module for 660A—the on-demand optical add-drop subsystem, integrated with 100A—the fast optical switch (wherein 100A—the fast optical switch is based on 120—the vanadium dioxide ultra-thin-film activated by an electrical pulse).

300C—the electronic subsystem integrates 240, 260 and 280C. 300C—the electronic subsystem to drive 660A.

240—the external controller can communicate serially with 260—the microprocessor/field programmable gate array.

Figure 9:
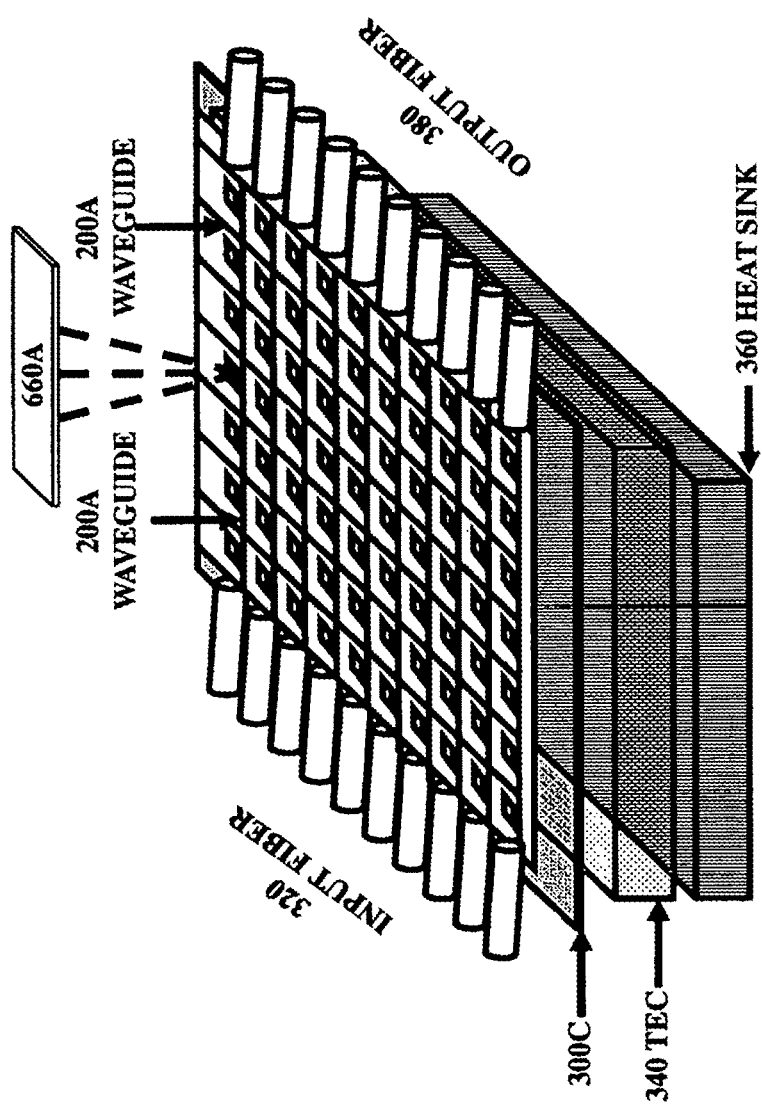
FIG. 9 illustrates an embodiment of an optical network processor system A comprising the on-demand optical add-drop subsystem in a matrix configuration (wherein the on-demand optical add-drop subsystem further comprises the fast optical switch based on vanadium dioxide ultra-thin-film activated by an electrical pulse).

FIG. 9 illustrates an embodiment of 680A—an optical network processor system, comprising 660A—the on-demand optical add-drop subsystem in a matrix configuration, wherein 660A—the on-demand optical add-drop subsystem comprises 100A—the fast optical switch is based on 120—the vanadium dioxide ultra-thin-film activated by an electrical pulse just to induce an insulator-to-metal phase transition in 120—the vanadium dioxide ultra-thin-film.

In FIG. 9, 680A denotes an optical network processor system A; 200A denotes the optical waveguide; 320 denotes the input single-mode optical fiber array; 300C denotes the electronic subsystem to drive 660A—the on-demand optical add-drop subsystem; 340 denotes the thermoelectric cooler to maintain 680A—the optical network processor system A at a specified temperature; 360 denotes the heat sink and 380 denotes the output single-mode optical fiber array.

Thus, 680A—the optical network processor system A, demultiplex, multiplex can switch a wavelength from any input fiber to any output fiber.

Figure 10:
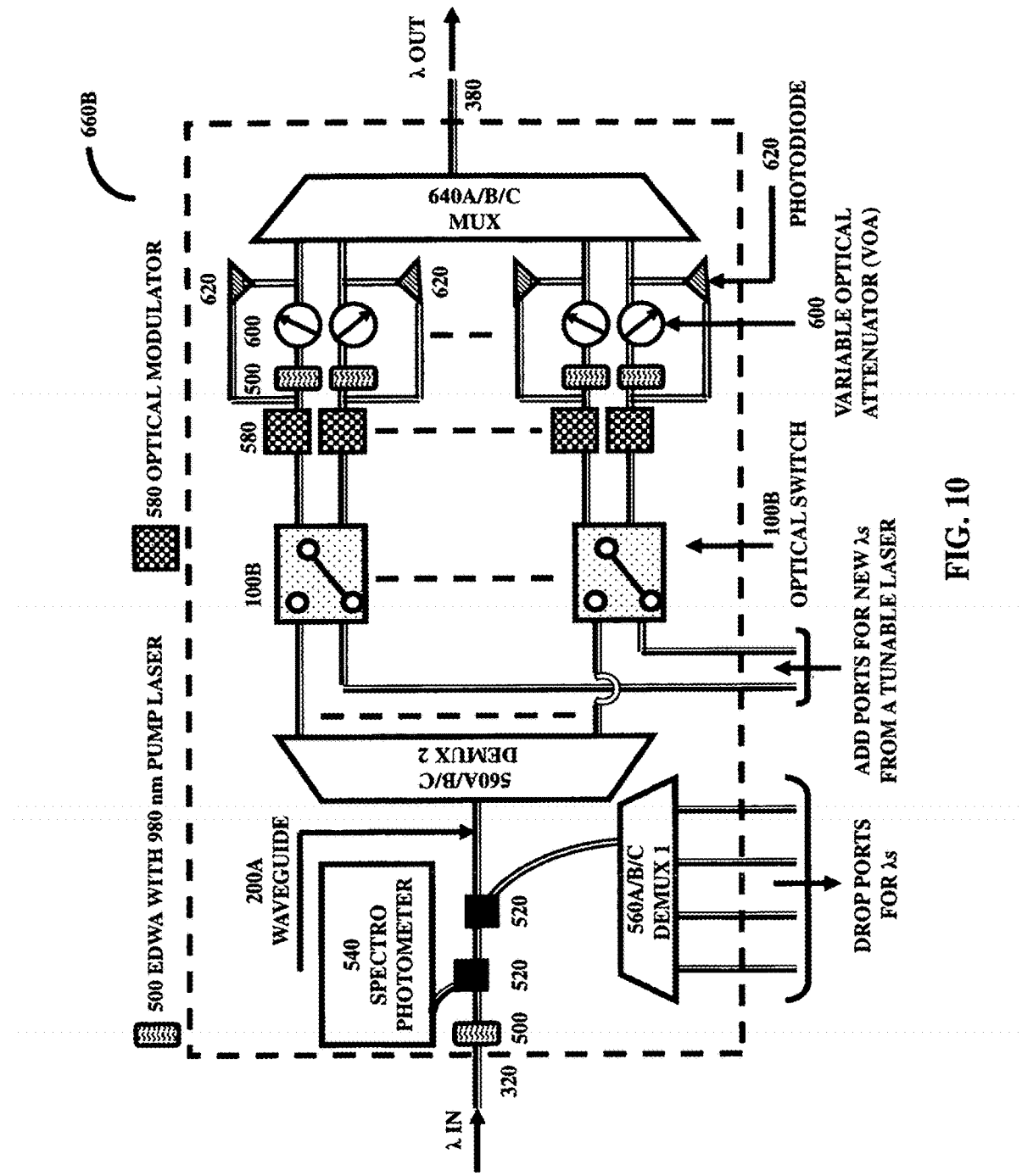
FIG. 10 illustrates an on-demand optical add-drop subsystem integrated with the fast optical switch (wherein the fast optical switch is based on vanadium dioxide ultra-thin-film activated by a light pulse).

FIG. 10 illustrates 660B—an on-demand optical add-drop subsystem, integrated with 100B—the fast optical switch (wherein 100B—the fast optical switch is based on 120—the vanadium dioxide ultra-thin-film activated by a light pulse).

In FIG. 10, all input wavelengths from 320—the input optical fiber can be transmitted via 200A—an optical waveguide and amplified by 500—the erbium doped waveguide amplifier integrated with a 980-nm pump laser, tapped by 520—the tap coupler to measure wavelengths by 540—the spectrophotometer. A few wavelengths can proceed to 560A/560B/560C—the first wavelength demultiplexer 1 and then exit to the drop ports. Other express wavelengths can proceed to 560A/560B/560C—the second wavelength demultiplexer 2 for demultiplexing, then as selective inputs to 100B—the fast optical switch.

An array of rapidly wavelength tunable lasers can provide a set of new wavelengths to the add ports. The output (wavelengths) of 560A/560B/560C—the second wavelength demultiplexer 2 and these newly added wavelengths can be switched by an array of 100Bs—the fast optical switches.

Switched wavelengths from 100Bs—the fast optical switches can be modulated by an array of 580s—the optical modulators.

The optical power output of 580—the optical modulator can be controlled by 500—the erbium doped waveguide amplifier integrated with a 980-nm pump laser, 600—the variable optical attenuator and 620—the photodiode.

The modulated wavelengths (or modulated optical signals) can be independently controlled at a specified optical power and then multiplexed by 640A/640B/640C—the multiplexer. Thus, independent control of each wavelength can enable an approximately flat optical power curve for all output wavelengths at 380—the output optical fiber.

Figure 11:
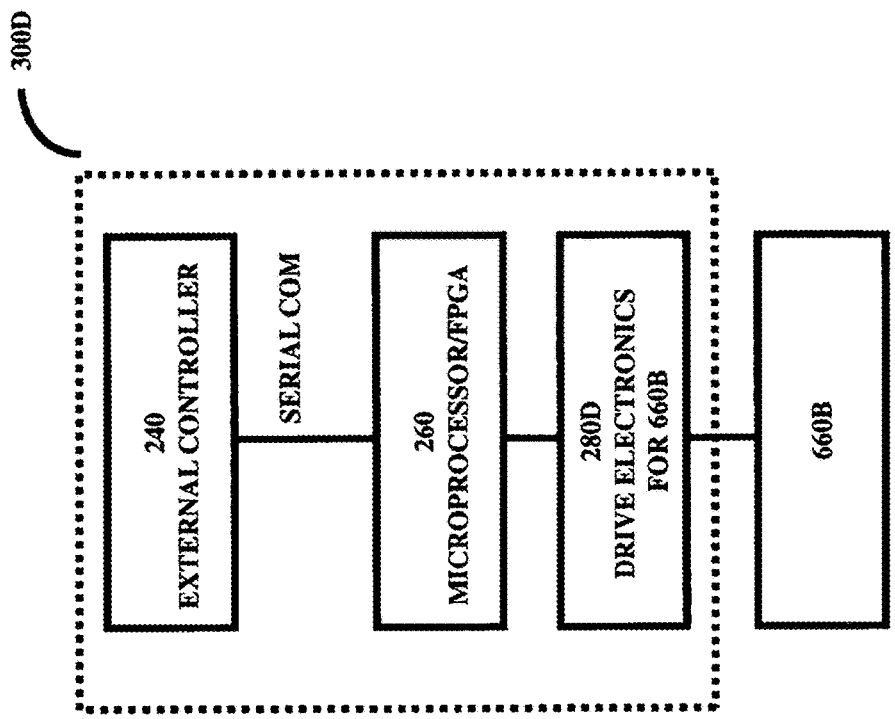
FIG. 11 illustrates an embodiment of an electronic subsystem to drive the on-demand optical add-drop subsystem integrated with the fast optical switch (wherein the fast optical switch is based on vanadium dioxide ultra-thin-film activated by a light pulse).

FIG. 11 illustrates an embodiment of 300D—an electronic subsystem to drive 660B—the on-demand optical add-drop subsystem, integrated with 100B—the fast optical switch (wherein 100B—the fast optical switch is based on 120—the vanadium dioxide ultra-thin-film activated by a light pulse).

In FIG. 11, 240 denotes the external controller, 260 denotes the microprocessor/field programmable gate array and 280D denotes a drive electronics unit/module for 660B—the on-demand optical add-drop subsystem, integrated with 100B—the fast optical switch (wherein 100B—the fast optical switch is based on 120—the vanadium dioxide ultra-thin-film activated by a light pulse).

300D—the electronic subsystem integrates 240, 260 and 280D. 300D—the electronic subsystem is to drive 660B.

240—the external controller can communicate serially with 260—the microprocessor/field programmable gate array.

Figure 12:
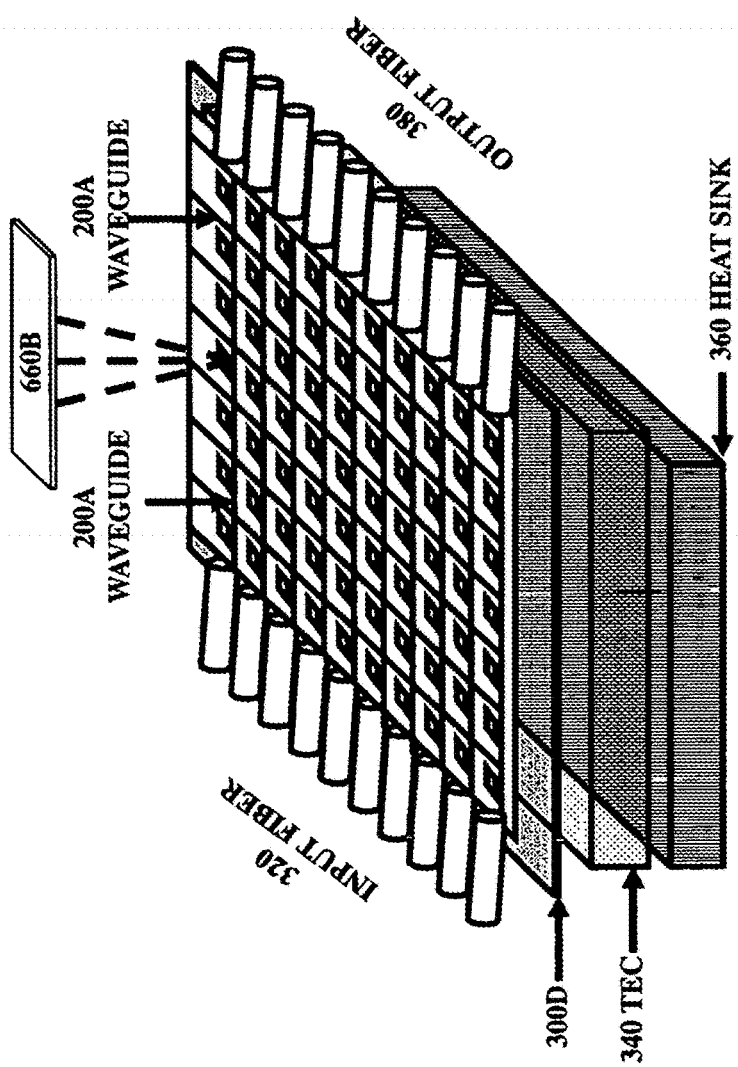
FIG. 12 illustrates an embodiment of an optical network processor system B, comprising the on-demand optical add-drop subsystem in a matrix configuration (wherein the on-demand optical add-drop subsystem further comprises the fast optical switch based on vanadium dioxide ultra-thin-film activated by a light pulse).

FIG. 12 illustrates an embodiment of 680B—an optical network processor system B, comprising 660B—the on-demand optical add-drop subsystem in a matrix configuration, wherein 660B—the on-demand optical add-drop subsystem comprises 100B—the fast optical switch is based on 120—the vanadium dioxide ultra-thin-film activated by a light pulse just to induce an insulator-to-metal phase transition in 120—the vanadium dioxide ultra-thin-film.

In FIG. 12, 680B denotes the optical network processor system B; 200A denotes the optical waveguide; 320 denotes the input single-mode optical fiber array; 300D denotes the electronic subsystem to drive 660B—the on-demand optical add-drop subsystem; 340 denotes the thermoelectric cooler to maintain; 680B—the optical network processor system B at a specified temperature; 360 denotes the heat sink and 380 denotes the output single-mode optical fiber array.

Thus, 680B—the optical network processor system B, demultiplex, multiplex can switch a wavelength from any input fiber to any output fiber.

Figure 13A:
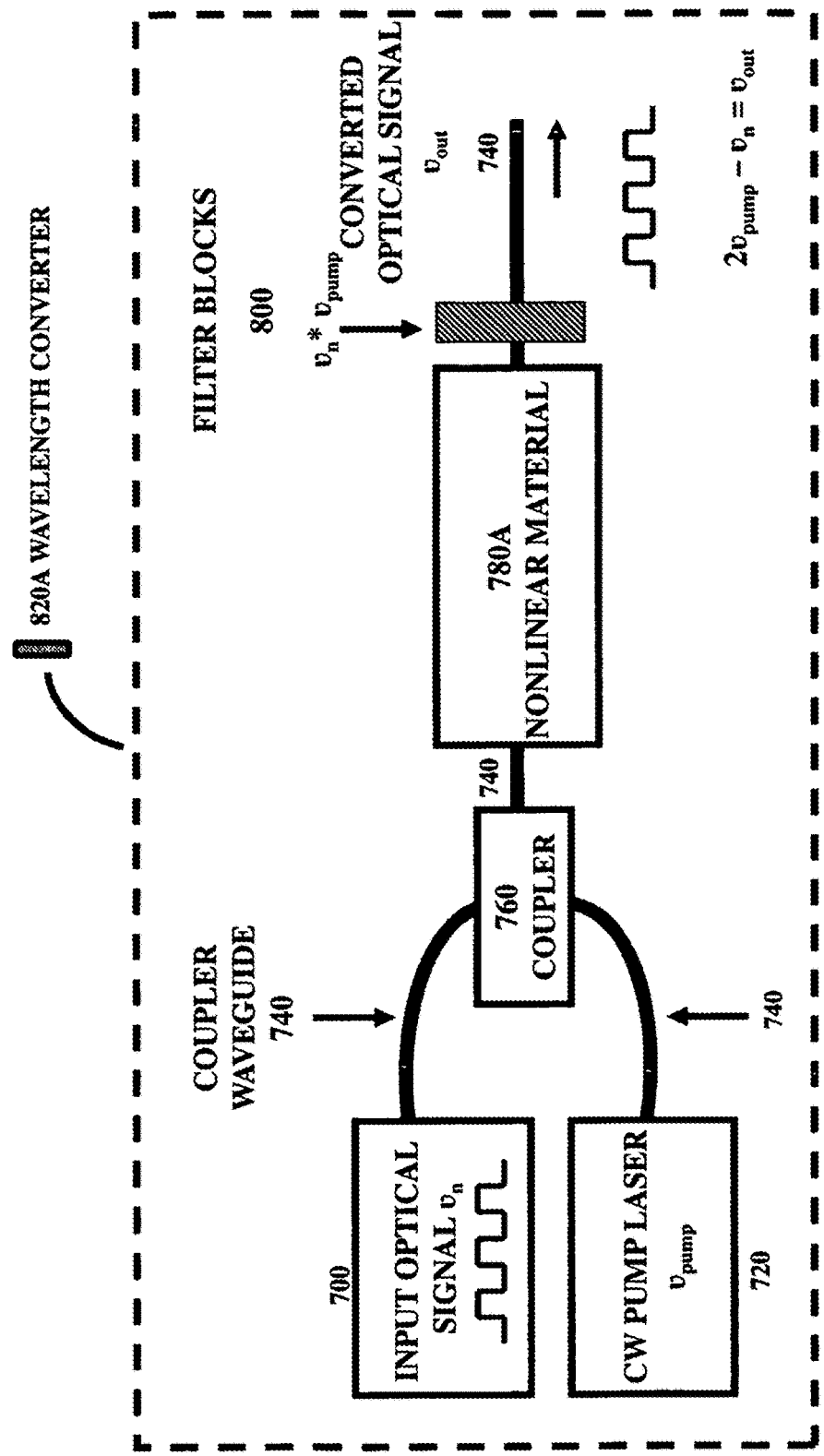
FIG. 13A illustrates an embodiment of a wavelength converter based on a nonlinear four-wave mixing material.

FIG. 13A illustrates 820A—an embodiment of a wavelength converter, wherein 760—a coupler connects to 700—an input optical signal and 720—a pump laser via 740—a coupler waveguide. 760—the coupler is optically coupled with 780A—$As_2S_3$ chalcogenide, a four-wave mixing non-linear material. The output of 780A—$As_2S_3$ chalcogenide, a four-wave mixing non-linear material, can be optically coupled with 800—a specific filter block. The output of 800—the filter block is the converted wavelength.

Figure 13B:
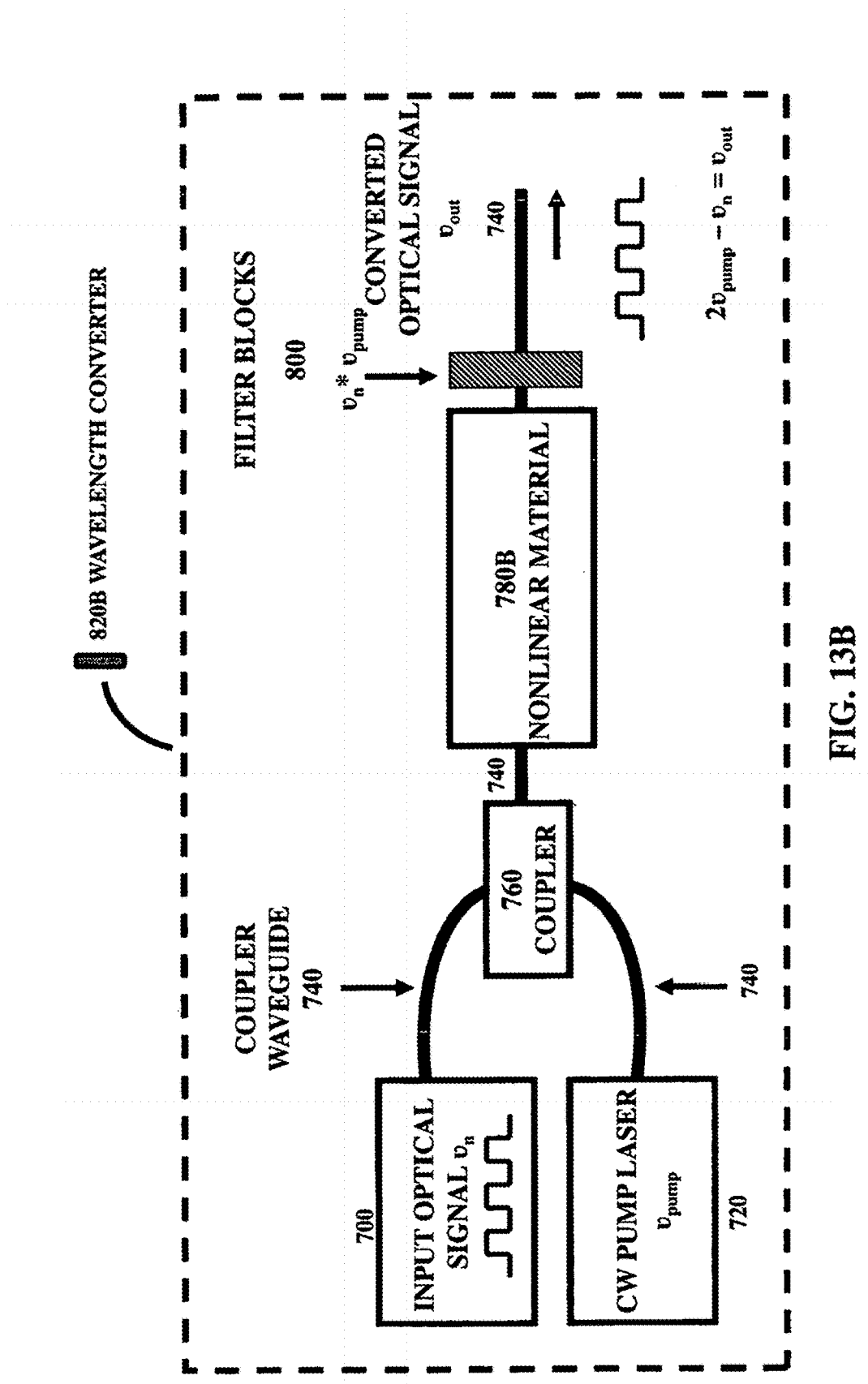
FIG. 13B illustrates another embodiment of a wavelength converter based on another nonlinear four-wave mixing material.

FIG. 13B illustrates 820B—an embodiment of a wavelength converter, wherein 760—a coupler connects to 700—an input optical signal and 720—a pump laser via 740—a coupler waveguide. 760—the coupler is optically coupled with 780B-two-dimensional photonic crystal-based $As_2S_3$ chalcogenide, a lour-wave mixing non-linear material. The output of 780B—two-dimensional photonic crystal-based $As_2S_3$ chalcogenide, a four-wave mixing non-linear material, can be optically coupled with 800—the specific filter block. The output of 800—the filter block is the converted wavelength.

Figure 13C:
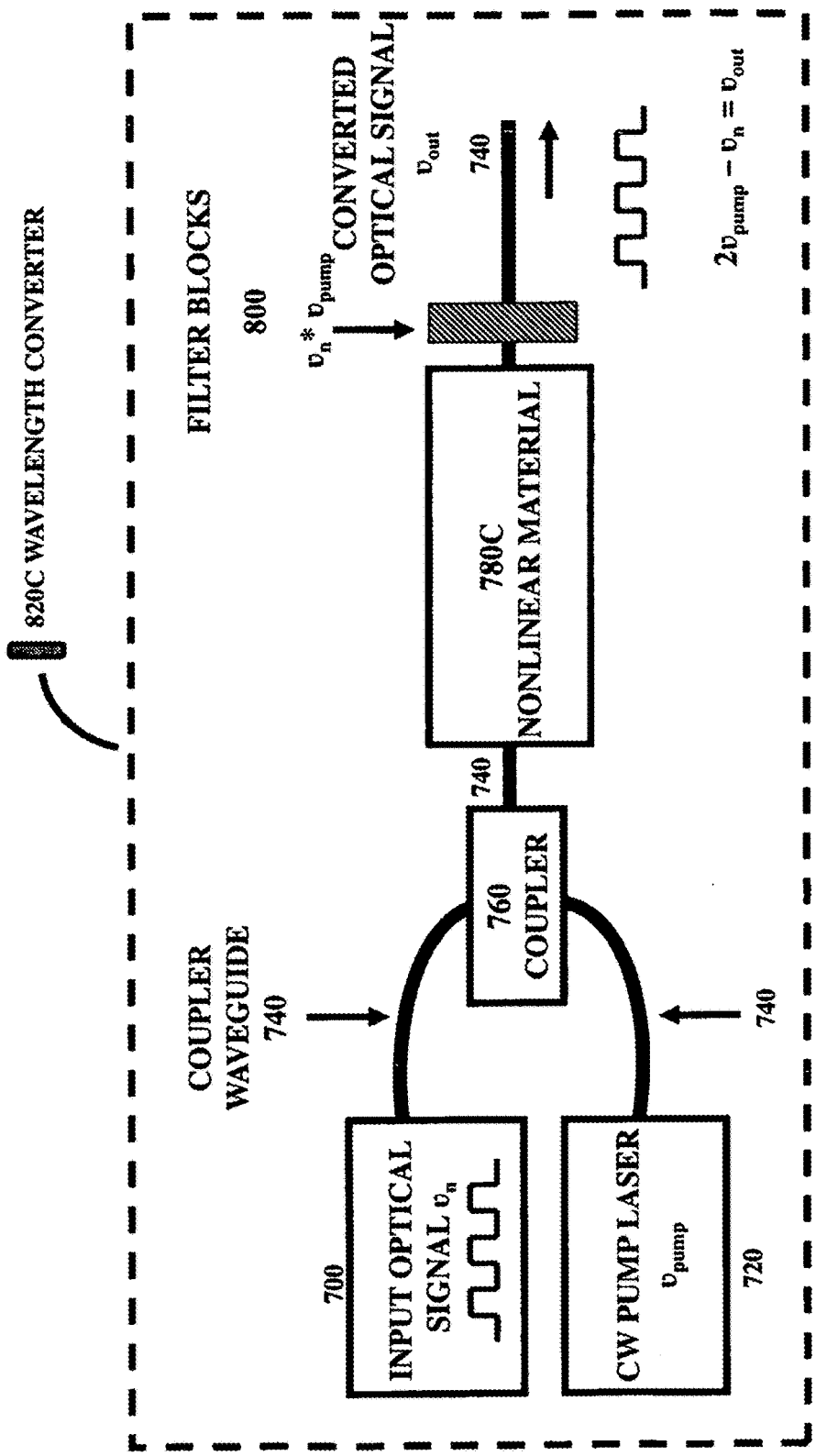
FIG. 13C illustrates another embodiment of a wavelength converter based on another nonlinear four-wave mixing material.

FIG. 13C illustrates 820C—an embodiment of a wavelength converter, wherein 760—a coupler connects to 700—an input optical signal and 720—a pump laser via 740—a coupler waveguide. 760—the coupler is optically coupled with 780C-graphene on two-dimensional photonic crystal silicon waveguide, a four-wave mixing non-linear material. The output of 780C—graphene on two-dimensional photonic crystal silicon waveguide, a four-wave mixing non-linear material, can be optically coupled with 800—the specific filter block. The output of 800—the filter block is the converted wavelength.

Alternatively, a wavelength converter can be fabricated/constructed utilizing a semiconductor optical amplifier or a quantum dot-based semiconductor optical amplifier (QD-SOA).

Figure 14:
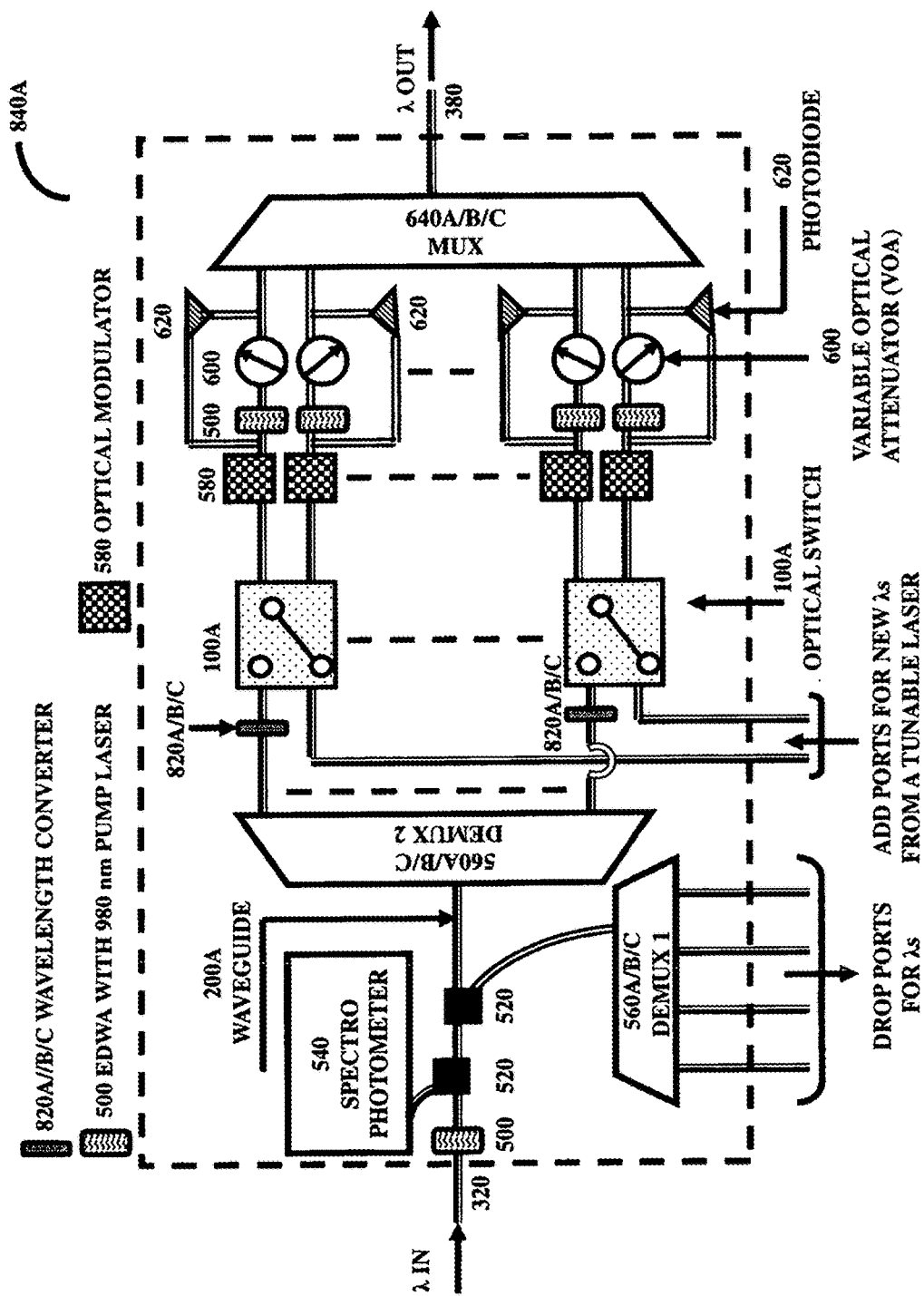
FIG. 14 illustrates an on-demand optical add-drop subsystem integrated with the fast optical switch (wherein the fast optical switch is based on vanadium dioxide ultra-thin-film activated by an electrical pulse) and a wavelength converter.

FIG. 14 illustrates 840A—an on-demand optical add-drop subsystem, integrated with 100A—the fast optical switch (wherein 100A—the fast optical switch is based on 120—the vanadium dioxide ultra-thin-film activated by an electrical pulse) and 820A/B/C—the wavelength converter.

In FIG. 14, all input wavelengths from 320—the input optical fiber can be transmitted via 200A—an optical waveguide and amplified by 500—the erbium doped waveguide amplifier integrated with a 980-nm pump laser, tapped by 520—the tap coupler to measure wavelengths by 540—the spectrophotometer. A few wavelengths can proceed to 560A/560B/560C—the first wavelength demultiplexer 1 and then exit-to the drop ports. Other express wavelengths can proceed to 560A/560B/560C—the second wavelength demultiplexer 2 for demultiplexing, then as selective inputs to 100A—the fast optical switch.

An array of rapidly wavelength tunable lasers can provide a set of new wavelengths to the add ports. The output (wavelengths) of 560A/560B/560C—the second wavelength demultiplexer 2 can converted in wavelength by an array of 820A/B/Cs—the wavelength converters. Thus, the converted wavelengths from the array 820A/B/Cs—the wavelength converters and these newly added wavelengths can be switched by an array of 100As—the fast optical switches.

Switched wavelengths from 100As—the fast optical switches can be modulated by an array of 580s—the optical modulators.

The optical power output of 580—the optical modulator can be controlled by 500—the erbium doped waveguide amplifier integrated with a 980-nm pump laser, 600—the variable optical attenuator and 620—the photodiode The modulated wavelengths (or modulated optical signals) can be independently controlled at a specified optical power and then multiplexed by 640A/640B/640C—the multiplexer. Thus, independent control of each wavelength can enable approximately flat optical power curve for all output wavelengths at 380—the output optical fiber.

Figure 15:
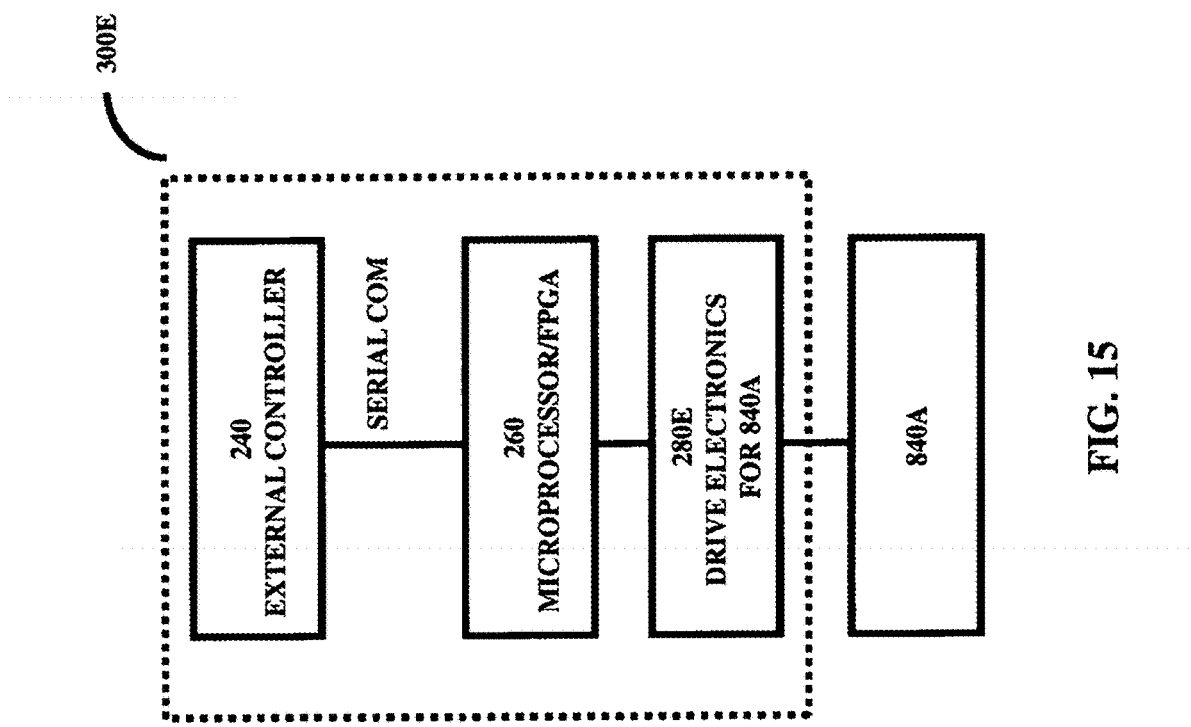
FIG. 15 illustrates an embodiment of an electronic subsystem to drive the on-demand optical add-drop subsystem; integrated with the fast optical switch (wherein the fast optical switch is based on vanadium dioxide ultra-thin-film activated by an electrical pulse) and the wavelength converter.

FIG. 15 illustrates an embodiment of 300E—an electronic subsystem to drive 840A—the on-demand optical add-drop subsystem, integrated with 100A—the fast optical switch (wherein 100A—the fast optical switch is based on 120—the vanadium dioxide ultra-thin-film activated by an electrical pulse) and 820A/B/C—the wavelength converter.

In FIG. 15, 240 denotes the external controller, 260 denotes the microprocessor/field programmable gate array and 280E denotes a drive electronics unit/module for 840A—the on-demand optical add-drop subsystem, integrated with 100A—the fast optical switch (wherein 100A—the fast optical switch is based on 120—the vanadium dioxide ultra-thin-film activated by an electrical pulse) and 820A/B/C—the wavelength converter.

300E—the electronic subsystem integrates 240, 260 and 280E. 300E—the electronic subsystem to drive 840A.

Figure 16:
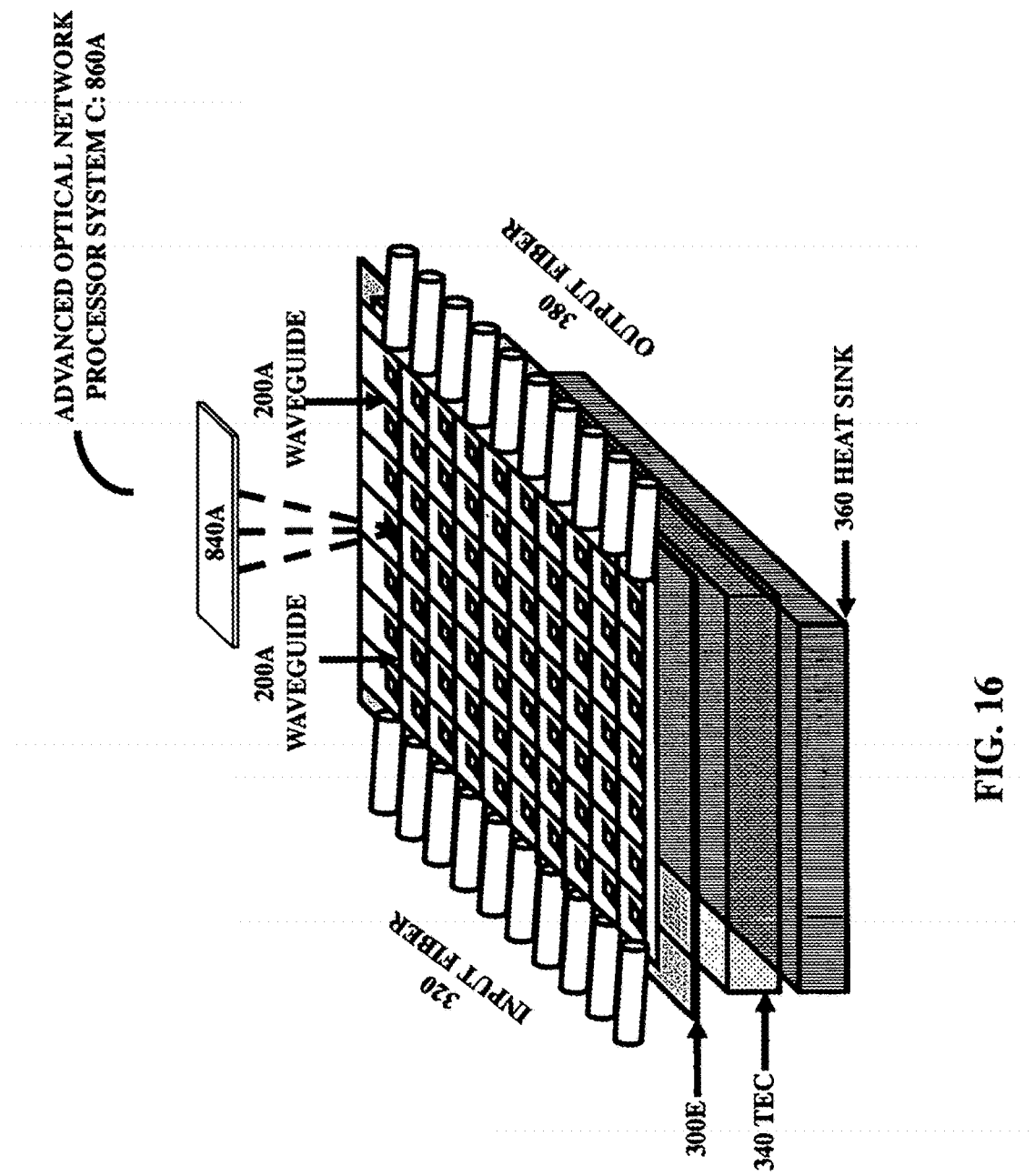
FIG. 16 illustrates an embodiment of an advanced optical network processor system C; comprising the on-demand optical add-drop subsystem in a matrix configuration (wherein the on-demand optical add-drop subsystem further comprises the fast optical switch based on vanadium dioxide ultra-thin-film activated by an electrical pulse) and the wavelength converter.

240—the external controller can communicate serially with 260—the microprocessor/field programmable gate array FIG. 16 illustrates an embodiment of 860A—an advanced optical network processor system C in a matrix configuration, wherein 860A—the advanced optical network processor system C comprising—840A—the on-demand optical add-drop subsystem, wherein 840A—the on-demand optical add-drop subsystem comprises (a) 100A—the fast optical switch based on 120—the vanadium dioxide ultra-thin-film activated by an electrical pulse just to induce an insulator-to-metal phase transition in 120—the vanadium dioxide ultra-thin-film and (b) 820A/B/C—the wavelength converter.

In FIG. 16, 860A denotes the advanced optical network processor system C; 200A denotes the optical waveguide; 320 denotes the input single-mode optical fiber array; 300E denotes the electronic subsystem to drive 840A—the advanced optical network processor system C; 340 denotes the thermoelectric cooler to maintain 860A—the advanced optical network processor system C at a specified temperature; 360 denotes the heat sink and 380 denotes the output single-mode optical fiber array.

Thus, 860A—the advanced optical network processor system C can demultiplex, multiplex, convert and switch a wavelength from any input fiber to any output fiber.

Figure 17:
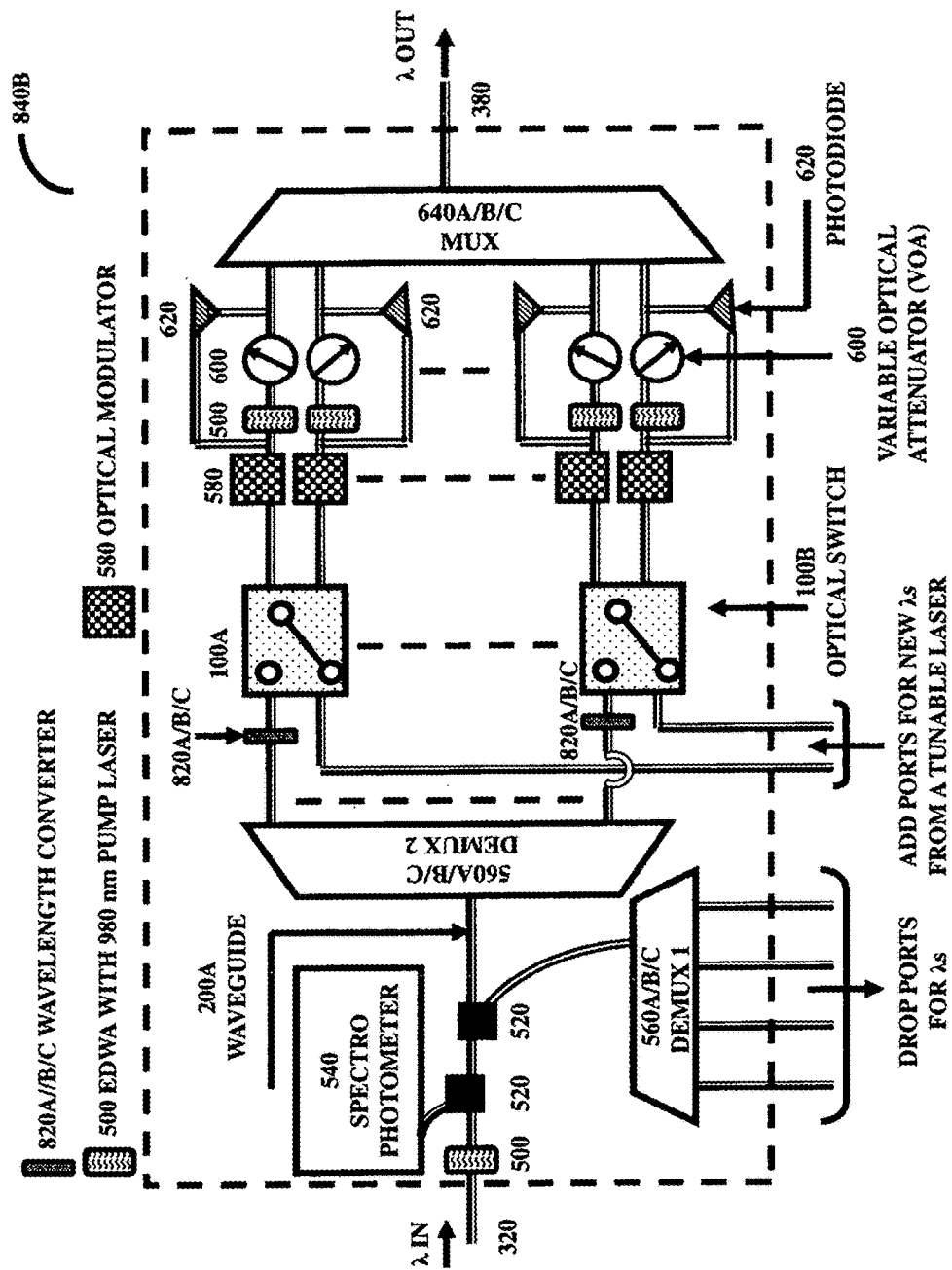
FIG. 17 illustrates an on-demand optical add-drop subsystem integrated with the fast optical switch (wherein the fast optical switch is based on vanadium dioxide ultra-thin-film activated by a light pulse) and the wavelength converter.

FIG. 17 illustrates 840B—an on-demand optical add-drop subsystem, integrated with 100B—the fast optical switch (wherein 100B—the fast optical switch is based on 120—the vanadium dioxide ultra-thin-film activated by a light pulse) and 820A/B/C—the wavelength converter.

In FIG. 17, all input wavelengths from 320—the input optical fiber can be transmitted via 200A—an optical waveguide and amplified by 500—the erbium doped waveguide amplifier integrated with a 980-nm pump laser, tapped by 520—the tap coupler to measure wavelengths by 540—the spectrophotometer. A few wavelengths can proceed to 560A/560B/560C—the first wavelength demultiplexer 1 and then exit to the drop ports. Other express wavelengths can proceed to 560A/560B/560C—the second wavelength demultiplexer 2 for demultiplexing, then as selective inputs to 100B—the fast optical switch.

An array of rapidly wavelength tunable lasers can provide a set of new wavelengths to the add ports. The output (wavelengths) of 560A/560B/560C—the second wavelength demultiplexer 2 can be converted in wavelength by an array of 820A/B/Cs—the wavelength converters. Thus, the converted wavelengths from the array 820A/B/Cs—the wavelength converters and these newly added wavelengths can be switched by an array of 100Bs—the fast optical switches.

Switched wavelengths from 100Bs—the fast optical switches can be modulated by an array of 580s—the optical modulators.

The optical power output of 580—the optical modulator can be controlled by 500—the erbium doped waveguide amplifier integrated with a 980-nm pump laser, 600—the variable optical attenuator and 620—the photodiode The modulated wavelengths (or modulated optical signals) can be independently controlled at a specified optical power and then multiplexed by 640A/640B/640C—the multiplexer. Thus, independent control of each wavelength can enable an approximately flat optical power curve for all output the wavelengths at 380—the output optical fiber.

Figure 18:
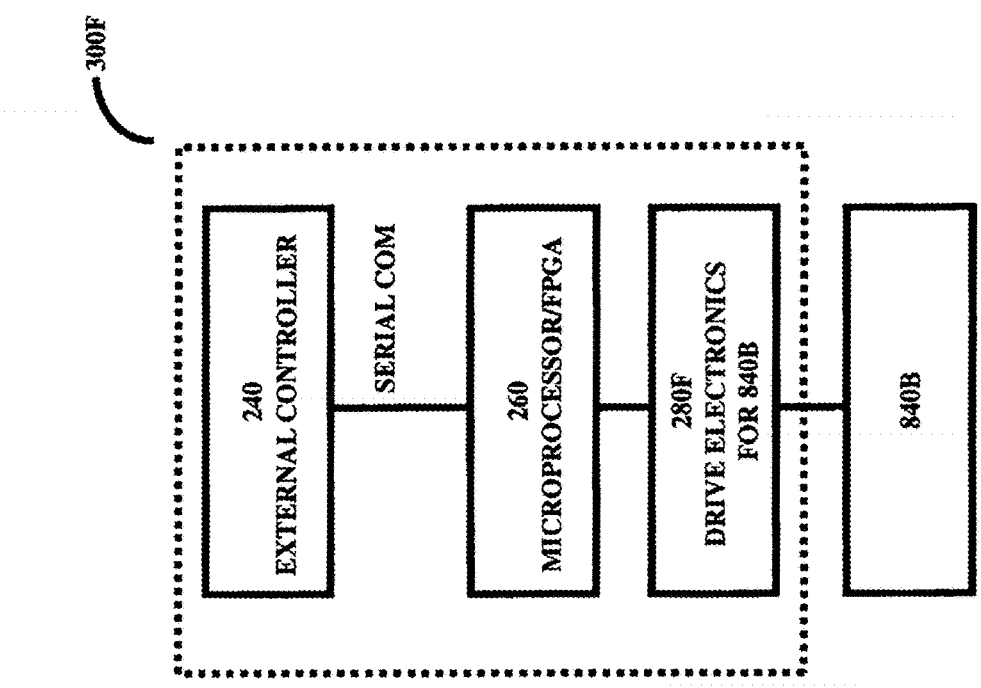
FIG. 18 illustrates an embodiment of an electronic subsystem to drive the on-demand optical add-drop subsystem integrated with the fast optical switch (wherein the fast optical switch is based on vanadium dioxide ultra-thin-film activated by a light pulse) and the wavelength converter.

FIG. 18 illustrates an embodiment of 300F—an electronic subsystem to drive 840B—the on-demand optical add-drop subsystem, integrated with 100B—the fast optical switch (wherein 100B—the fast optical switch is based on 120—the vanadium dioxide ultra-thin-film activated by a light pulse) and 820A/B/C—the wavelength converter.

In FIG. 18, 240 denotes the external controller, 260 denotes the microprocessor/field programmable gate array and 280F denotes a drive electronics unit/module for 840B—the on-demand optical add-drop subsystem, integrated with 100B—the fast optical switch (wherein 100B—the fast optical switch is based on 120—the vanadium dioxide ultra-thin-film activated by a light pulse) and 820A/B/C—the wavelength converter.

300F—the electronic subsystem integrates 240, 260 and 280F. 300F—the electronic subsystem is to drive 840B.

Figure 19:
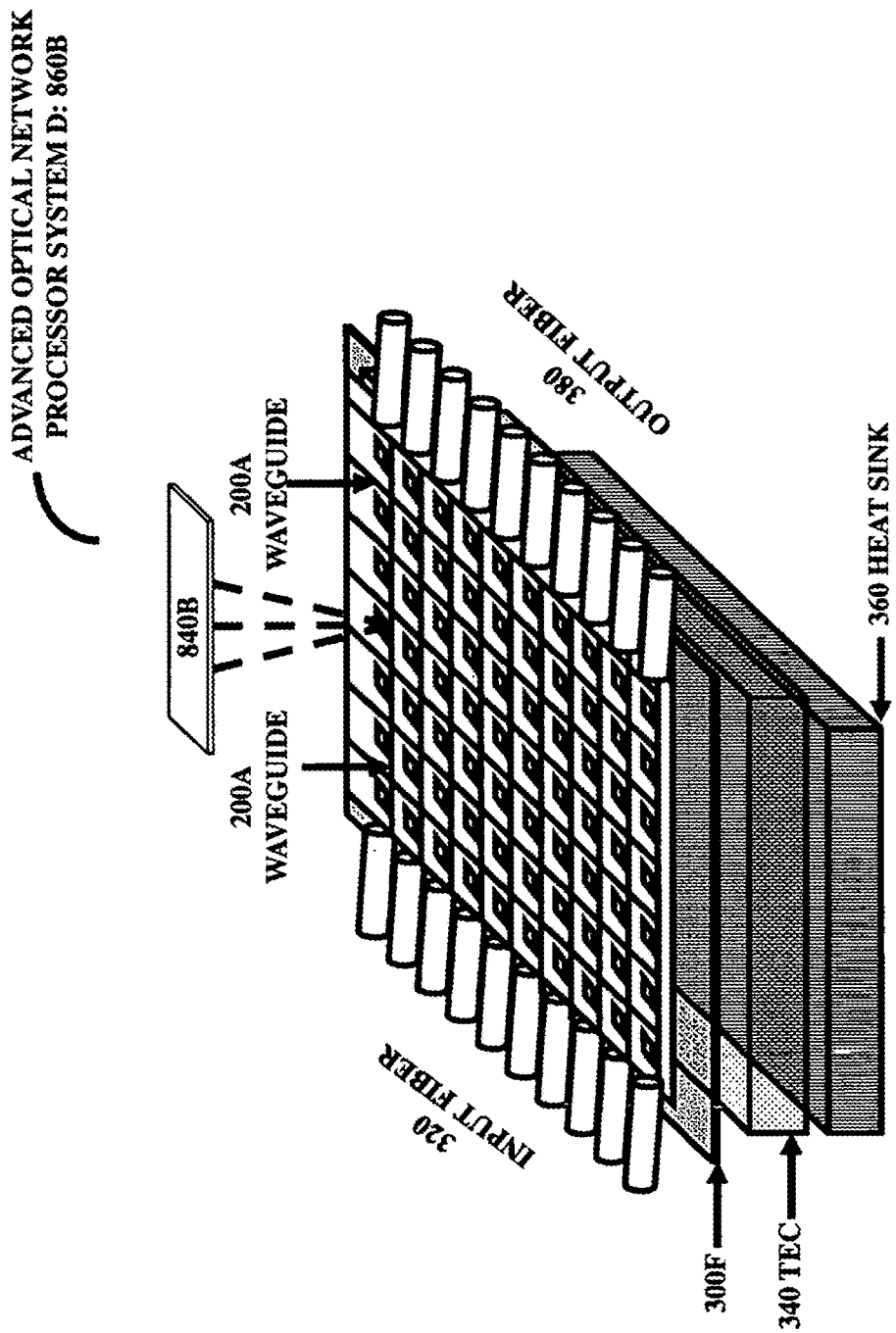
FIG. 19 illustrates an embodiment of an advanced optical network processor system D comprising the on-demand optical add-drop subsystem in a matrix configuration (wherein the on-demand optical add-drop subsystem further comprises the fast optical switch based on vanadium dioxide ultra-thin-film activated by a light pulse) and the wavelength converter.

240—the external controller can communicate serially with 260—the microprocessor/field programmable gate array FIG. 19 illustrates an embodiment of 860B—an advanced optical network processor system D in a matrix configuration, wherein 860B—the advanced optical network processor system D comprising—840B—the on-demand optical add-drop subsystem, wherein 840B—the on-demand optical add-drop subsystem comprises (a) 100B—the fast optical switch is based on 120—the vanadium dioxide ultra-thin-film activated by a light pulse just to induce an insulator-to-metal transition in 120—the vanadium dioxide ultra-thin-film, and (b) 820A/B/C—the wavelength converter.

In FIG. 19, 860B denotes the advanced optical network processor system D; 200A denotes the optical waveguide; 320 denotes the input single-mode optical fiber array; 300F denotes the electronic subsystem to drive 840B—the advanced optical network processor system D; 340 denotes the thermoelectric cooler to maintain 860B—the advanced optical network processor system D at a specified temperature; 360 denotes the heat sink and 380 denotes the output single-mode optical fiber array.

Thus, 860B—the advanced optical network processor system D can demultiplex, multiplex, convert and switch a wavelength from any input fiber to any output fiber.

100A/100B can be integrated with a semiconductor laser/widely tunable semiconductor laser/widely tunable fast switching semiconductor laser at 180A—the input waveguide and/or at 180B—the input waveguide for higher functionality. Such integration can include coupling from waveguide to waveguide via a collimating lens, wherein the collimating lens can be suitably positioned by a microelectro-mechanical system (MEMS)/nanoelectromechanical system (NEMS) based actuator.

100A/100B can be integrated with an array of semiconductor lasers/widely tunable semiconductor lasers/widely tunable fast switching semiconductor lasers at 180A—the input waveguide and/or at 180B—the input waveguide for higher functionality. Such integration can include coupling of the array of semiconductor lasers/widely tunable semiconductor lasers/widely tunable fast switching semiconductor lasers to 180A—the input waveguide and/or at 180B—the input waveguide via a microelectromechanical system/nanoelectromechanical system-based tilt mirror.

400A, 400B, 680A, 680B, 860A and 860B can be integrated with microring resonator filters and/or wavelength tunable optical dispersion compensators.

Furthermore, 400A, 400B, 680A, 680B, 860A and 860B can be integrated with biplexer filters and/or triplexer filters.

400A or 400B can be integrated with a log$_2$N demultiplexer for optical packet switched optical networks, where the switching delay is critical for high performance. A log$_2$N demultiplexer can consist of rectangular-shaped periodic frequency filters connected in series, wherein the rectangular-shaped periodic frequency filters can be formed in a one-dimensional photonic crystal structure on a ridge waveguide.

Flip-chip bonding was developed as an alternative to wire bonding. In flip-chip bonding, components are flipped upside-down and placed on an array of solder bumps that form the connection between a device and circuit. 400A, 400B, 680A, 680B, 860A and 860B can be packaged utilizing flip-chip bonding onto a precise silicon-on-insulator substrate.

Single-mode optical fibers can be aligned passively with precise metal alignment pins seated into v-grooves on the precise substrate. The precise metal alignment pins can be utilized top mate with a pluggable optical fiber connector integrated with a molded plastic lens. Alternatively, an array of multi-mode optical fibers can be used instead of an array of single-mode optical fibers for short distance (e.g., LAN) applications.

In the above disclosed specifications "I" has been used to indicate an "or" and real-time means near real-time in practice.

Preferred Embodiments & Scope of the Invention

Any example in the above disclosed specifications is by way of an example only and not by way of any limitation.

The best mode requirement "requires an inventor(s) to disclose the best mode contemplated by him/her, as of the time he/she executes the application, of carrying out the invention." " . . . [T]he existence of a best mode is a purely subjective matter depending upon what the inventor(s) actually believed at the time the application was filed." See Bayer AG v. Schein Pharmaceuticals, Inc. The best mode requirement still exists under the America Invents Act (AIA). At the time of the invention, the inventor(s) described preferred best mode embodiments of the present invention. The sole purpose of the best mode requirement is to restrain the inventor(s) from applying for a patent, while at the same time concealing from the public preferred embodiments of their inventions, which they have in fact conceived. The best mode inquiry focuses on the inventor(s)' state of mind at the time he/she filed the patent application, raising a subjective factual question. The specificity of disclosure required to comply with the best mode requirement must be determined by the knowledge of facts within the possession of the inventor(s) at the time of filing the patent application. See Glaxo, Inc. v. Novopharm LTD., 52 F.3d 1043, 1050 (Fed. Cir. 1995).

The above disclosed specifications are the preferred best mode embodiments of the present invention. However, they are not intended to be limited only to the preferred best mode embodiments of the present invention. Numerous variations and/or modifications are possible within the scope of the present invention. Accordingly, the disclosed preferred best mode embodiments are to be construed as illustrative only. Those who are skilled in the art can make various variations and/or modifications (e.g., a light emitting diode instead of a laser) without departing from the scope and spirit of this invention. It should be apparent that features of one embodiment can be combined with one or more features of another embodiment to form a plurality of embodiments. The inventor(s) of the present invention is not required to describe each and every conceivable and possible future embodiment in the preferred best mode embodiments of the present invention. See SRI Int'l v. Matsushita Elec. Corp. of America, 775F.2d 1107, 1121, 227 U.S.P.Q. (BNA) 577, 585 (Fed. Cir. 1985) (enbanc). The scope and spirit of this invention shall be defined by the claims and the equivalents of the claims only. The exclusive use of all variations and/or modifications within the scope of the claims is reserved. The general presumption is that claim terms should be interpreted using their plain and ordinary meaning. See Oxford Immunotec Ltd. v. Qiagen, Inc. et al., Action No. 15-cv-13124-NMG. Unless a claim term is specifically defined in the preferred best mode embodiments, then a claim term has an ordinary meaning, as understood by a person with an ordinary skill in the art, at the time of the present invention. As noted long ago: "Specifications teach. Claims claim". See Rexnord Corp. v. Laitram Corp., 274 F.3d 1336, 1344 (Fed. Cir. 2001). The rights of claims (and rights of the equivalents of the claims under the Doctrine of Equivalents-meeting the "Triple Identity Test" (a) performing substantially the same function, (b) in substantially the same way and (c) yielding substantially the same result. See Crown Packaging Tech., Inc. v. Rexam Beverage Can Co., 559 F.3d 1308, 1312 (Fed. Cir. 2009)) of the present invention are not narrowed or limited by the selective imports of the specifications (of the preferred embodiments of the present invention) into the claims. The term "means" was not used nor intended nor implied in the disclosed preferred best mode embodiments of the present invention. Thus, the inventor(s) has not limited the scope of the claims as mean plus function. Additionally, "apparatus claims are not necessarily indefinite for using functional language . . . [f]unctional language may also be employed to limit the claims without using the means-plus-function format." See Microprocessor Enhancement Corp. v. Texas Instruments Inc.

The invention claimed is:

1. An optical switch comprising: a first optical waveguide and a second optical waveguide, wherein the first optical waveguide is less than 5 microns in width, wherein the second optical waveguide is less than 5 microns in width, wherein a section of the first optical waveguide is partially parallel or substantially parallel to a section of the second optical waveguide, wherein both the section of the first optical waveguide and the section of the second optical waveguide comprise: an ultra thin-film of thickness less than 0.15 microns, wherein the ultra thin-film comprises: vanadium dioxide and a two-dimensional (2-D) material, wherein the ultra thin-film is electrically coupled with two metal electrodes, wherein the ultra thin-film is receiving a voltage pulse or a current pulse via the two metal electrodes, just to induce insulator-to-metal (IMT) phase transition in vanadium dioxide.

2. The optical switch according to claim 1, further comprising a directionally coupled optical waveguides configuration or a multimode interference (MMI) coupler configuration or a Mach-Zehnder (MZ) configuration.

3. The optical switch according to claim 1, further comprising coupling with a wavelength multiplexer or a wavelength demultiplexer.

4. The optical switch according to claim 1, further comprising coupling with a wavelength tunable multiplexer or a wavelength tunable demultiplexer.

5. The optical switch according to claim 1, further comprising coupling with a wavelength tunable photonic crystal multiplexer or a wavelength tunable photonic crystal demultiplexer.

6. The optical switch according to claim 1, further comprising coupling with a wavelength converter.

7. The optical switch according to claim 6, comprising the wavelength converter, wherein the wavelength converter comprises $As_2S_3$ chalcogenide material or two-dimensional (2-D) photonic crystals $As_2S_3$ chalcogenide material or graphene on two-dimensional (2-D) photonic crystals of a silicon waveguide.

8. The optical switch according to claim 6, further comprising the wavelength converter, wherein the wavelength converter comprises a semiconductor optical amplifier or a quantum dot based semiconductor optical amplifier.

9. An optical switch comprising: a first optical waveguide and a second optical waveguide, wherein a section of the first optical waveguide is partially parallel or substantially parallel to a section of the second optical waveguide, wherein both the section of the first optical waveguide and the section of the second optical waveguide comprise: an ultra thin-film of thickness less than 0.15 microns, wherein the ultra thin-film comprises: vanadium dioxide and a two-dimensional (2-D) material, wherein the ultra thin-film is receiving a light pulse, just to induce insulator-to-metal (IMT) phase transition in vanadium dioxide.

10. The optical switch according to claim 9, further comprising an optical waveguide to propagate a beam of a light pulse and a focusing lens for focusing the beam of the light pulse,
   wherein an optical intensity of the beam of the light pulse is in a range of 0.1 $mJ/cm^2$ to 50 $mJ/cm^2$,
   wherein a pulse width of the beam of the light pulse is in a range of in the range of 0.001 nanoseconds to 0.1 nanoseconds.

11. The optical switch according to claim 9, further comprising an optical waveguide to propagate a beam of a light pulse and a metamaterial based lens for focusing the beam of the light pulse below diffraction resolution limit.

12. The optical switch according to claim 9, further comprising a directionally coupled optical waveguides configuration or a multimode interference (MMI) coupler configuration or a Mach-Zehnder (MZ) configuration.

13. The optical switch according to claim 9, further comprising coupling with a wavelength multiplexer or a wavelength demultiplexer.

14. The optical switch according to claim 9, further comprising coupling with a wavelength tunable multiplexer or a wavelength tunable demultiplexer.

15. The optical switch according to claim 9, further comprising coupling with a wavelength tunable photonic crystal multiplexer or a wavelength tunable photonic crystal demultiplexer.

16. The optical switch according to claim 9, further comprising coupling with a wavelength converter.

17. The optical switch according to claim 16, comprising: the wavelength converter, wherein the wavelength converter comprises $As_2S_3$ chalcogenide material or two-dimensional (2-D) photonic crystals $As_2S_3$ chalcogenide material or graphene on two-dimensional (2-D) photonic crystals of a silicon waveguide.

18. The optical switch according to claim 16, further comprising the wavelength converter, wherein the wavelength converter comprises a semiconductor optical amplifier or a quantum dot based semiconductor optical amplifier.

19. An optical network processor system comprising:
an optical switch comprising: a first optical waveguide and a second optical waveguide, wherein the first optical waveguide is less than 5 microns in width, wherein the second optical waveguide is less than 5 microns in width, wherein a section of the first optical waveguide is partially parallel or substantially parallel to a section of the second optical waveguide, wherein both the section of the first optical waveguide and the section of the second optical waveguide comprise: an ultra thin-film of thickness less than 0.15 microns, wherein the ultra thin-film comprises: vanadium dioxide and a two-dimensional (2-D) material, wherein the ultra thin-film is electrically coupled with two metal electrodes, wherein the ultra thin-film is receiving a voltage pulse or a current pulse via the two metal electrodes, just to induce insulator-to-metal (IMT) phase transition in vanadium dioxide; and
an optical add-drop subsystem, wherein the optical add-drop subsystem comprises: a wavelength multiplexer and a wavelength demultiplexer,
wherein the optical switch is optically coupled with the optical add-drop subsystem.

20. The optical network processor system according to claim 19, further comprising: a wavelength converter.

* * * * *